(12) United States Patent
McGraw et al.

(10) Patent No.: US 12,072,823 B2
(45) Date of Patent: Aug. 27, 2024

(54) FLEXIBLE HIGH-AVAILABILITY COMPUTING WITH PARALLEL CONFIGURABLE FABRICS

(71) Applicant: Hewlett Packard Enterprise Development LP, Houston, TX (US)

(72) Inventors: Montgomery C. McGraw, Magnolia, TX (US); Dwight D. Riley, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 135 days.

(21) Appl. No.: 17/245,455

(22) Filed: Apr. 30, 2021

(65) Prior Publication Data

US 2022/0350767 A1 Nov. 3, 2022

(51) Int. Cl.
*G06F 13/40* (2006.01)
*G06F 11/20* (2006.01)
*G06F 13/42* (2006.01)

(52) U.S. Cl.
CPC ...... *G06F 13/4027* (2013.01); *G06F 11/2007* (2013.01); *G06F 13/4282* (2013.01); *G06F 2213/0026* (2013.01)

(58) Field of Classification Search
CPC ............. G06F 13/4027; G06F 11/2007; G06F 13/4282; G06F 2213/0026
See application file for complete search history.

(56) References Cited

U.S. PATENT DOCUMENTS

| | | | | |
|---|---|---|---|---|
| 7,552,262 | B1 * | 6/2009 | Turner | H04L 49/115 710/316 |
| 10,277,677 | B2 | 4/2019 | Nachimuthu et al. | |
| 10,841,195 | B2 * | 11/2020 | Johnsen | H04L 41/12 |
| 11,288,122 | B1 * | 3/2022 | Fleisher | G06F 1/187 |
| 2004/0010600 | A1 * | 1/2004 | Baldwin | H04L 41/12 709/229 |
| 2004/0030763 | A1 * | 2/2004 | Manter | H04L 41/082 709/230 |
| 2004/0095927 | A1 * | 5/2004 | Chang | H04L 47/24 370/388 |

(Continued)

OTHER PUBLICATIONS

Mark Haranas, "Dell EMC Takes on HPE Synergy With 'Breakthrough' Composable Infrastructure," Aug. 21, 2018, pp. 1-4, Retrieved from the Internet on Oct. 11, 2019 at URL: <crn.com/data-center/dell-emc-takes-on-hpe-synergy-with-breakthrough-composable-infrastructure>.

(Continued)

*Primary Examiner* — Henry Tsai
*Assistant Examiner* — Harry Z Wang
(74) *Attorney, Agent, or Firm* — Sheppard Mullin Richter & Hampton LLP

(57) ABSTRACT

Composable computing architectures with an interconnection fabric to provide high availability and fault tolerance are described. An interconnection fabric routes packets between compute resources, memory resources, and input/output (I/O) resources. A fabric manager is coupled with the interconnection fabric to receive an I/O or memory requirement for a compute workload for a host device, and to map individual I/O or memory resources from the plurality of I/O resources to individual compute resources from the plurality of compute resource and to dynamically map individual I/O resources from the plurality of I/O resources based on received resource requests.

19 Claims, 13 Drawing Sheets

(56) References Cited

U.S. PATENT DOCUMENTS

| | | | | |
|---|---|---|---|---|
| 2007/0297406 | A1* | 12/2007 | Rooholamini | H04L 12/185 370/432 |
| 2010/0165984 | A1* | 7/2010 | Aybay | H04L 49/45 370/388 |
| 2010/0275058 | A1* | 10/2010 | Hashimoto | G06F 9/5077 718/1 |
| 2011/0261821 | A1* | 10/2011 | Hillier, III | H04L 45/245 370/394 |
| 2011/0320666 | A1* | 12/2011 | Gregg | G06F 13/385 710/300 |
| 2012/0263187 | A1* | 10/2012 | Belanger | H04L 49/1523 370/401 |
| 2013/0117621 | A1* | 5/2013 | Saraiya | H04L 49/70 714/E11.01 |
| 2013/0205053 | A1* | 8/2013 | Harriman | G06F 13/4295 710/105 |
| 2013/0268695 | A1* | 10/2013 | Toda | G06F 9/4411 710/8 |
| 2016/0140069 | A1* | 5/2016 | Harriman | G06F 13/4022 710/313 |
| 2018/0024757 | A1 | 1/2018 | Kumar et al. | |
| 2018/0046513 | A1 | 2/2018 | Breakstone et al. | |
| 2020/0341919 | A1* | 10/2020 | Lambert | G06F 13/4022 |

OTHER PUBLICATIONS

Mark Miquelon, "The Next Step in the Evolution of Composability," Aug. 5, 2019, pp. 1-9, Retrieved from the Internet on Oct. 11, 2019 at URL: <blog.westerndigital.com/next-step-evolution-of-composability/>.

Mellanox Technologies, "In-Hardware Storage Virtualization—NVMe SNAP™ Revolutionizes Data Center Storage Composable Storage Made Simple," Solution Brief, 2019, pp. 1-3, Retrieved from the Internet on Oct. 11, 2019 at URL: <mellanox.com/related-docs/solutions/SB_Mellanox_NVMe_SNAP.pdf>.

Mellanox Technologies, "Snap Composable Storage Made Simple," Mar. 2019, pp. 1-20, Retrieved from the Internet on Oct. 11, 2019 at URL: <146a55aca6f00848c565-a7635525d40ac1c70300198708936b4e.ssl.cf1.rackcdn.com/images/71ca563edc8adf3399091b04a94b91bb818c15b3.pdf>.

* cited by examiner

FLEXIBLE HIGH-AVAILABILITY COMPUTING WITH PARALLEL CONFIGURABLE FABRICS

BACKGROUND

Current custom configuration techniques typically involve selecting which components (e.g., processor, memory, input/output (I/O) interfaces, storage devices) are connected within a physical chassis. Interconnection can be provided, for example, by a Peripheral Component Interconnect (PCI)-compliant bus to which the components can be connected. PCI standards are available from PCI Special Interest Group (PCI-SIG) in Beaverton, Oregon, USA. By providing a standard interface, various components interconnected to provide the desired system configuration. However, these architectures are not optimally configured in terms of providing efficient use of computing functionality, resource utilization and/or fault tolerance.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
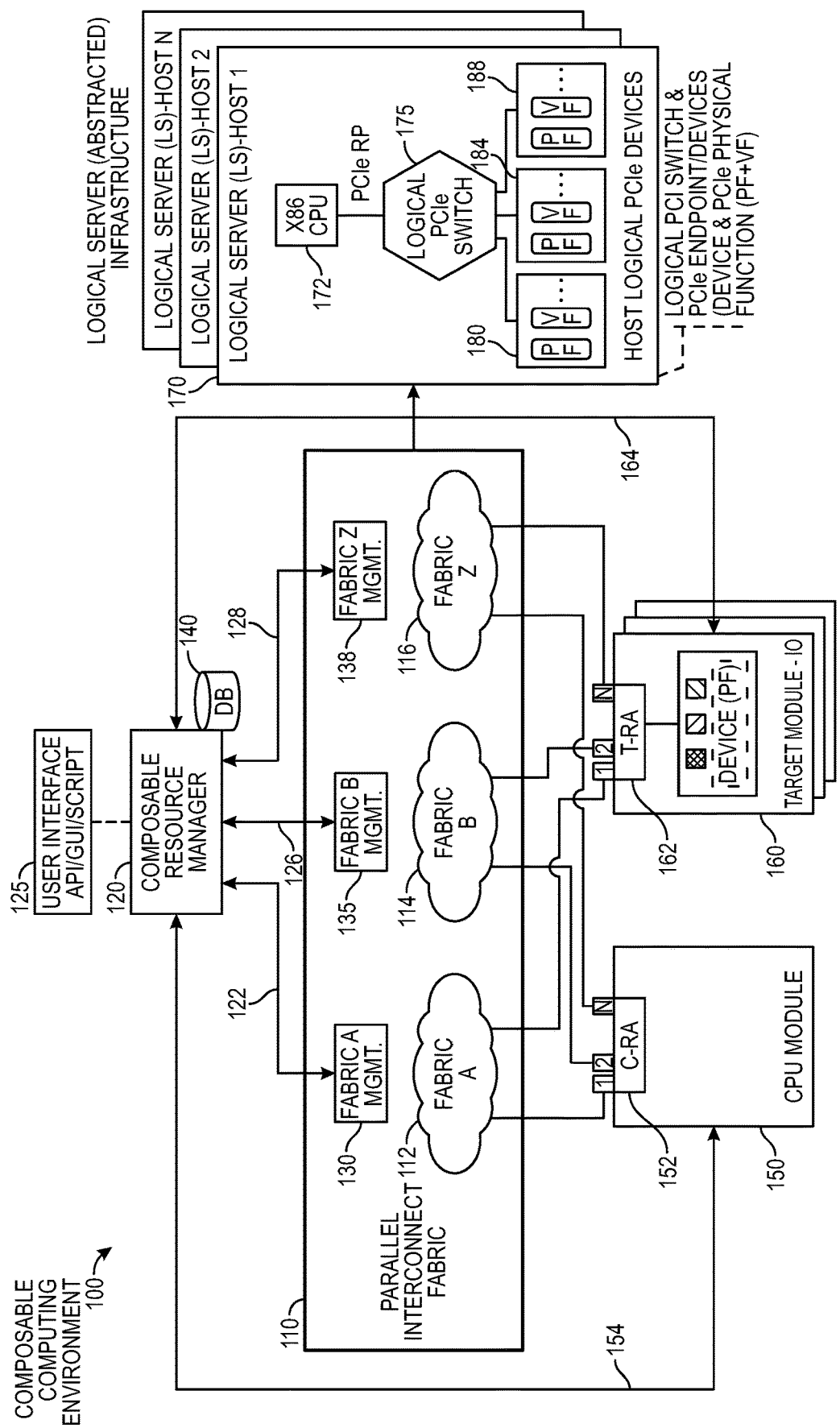
FIG. 1 is a block diagram of one embodiment of a composable computing environment having a single parallel interconnect fabric.

In the following description, numerous specific details are set forth. However, embodiments of the invention may be practiced without these specific details. In other instances, well-known structures and techniques have not been shown in detail in order not to obscure the understanding of this description.

As described in greater detail below, an efficient and configurable computing environment, referred to as a composable infrastructure architecture, can be provided that is modular, expandable, highly available. This composable infrastructure architecture is not constrained by distance and utilizes parallel interconnect fabrics that can provide parallel interconnections as well as advanced fault tolerance.

Various embodiments, the composable architecture described herein can provide the functionality to logically bind simple components, for example, a compute module (e.g., processor(s), memory), to I/O modules (e.g., Peripheral Component Interconnect Express, or "PCIe," Graphics Processing Units, or "GPUs," Network Interface Cards, or "NICs," Storage Controllers, Expansion Memory, Non-Volatile Memory Express, or "NVMe") across a carrier switching fabric (e.g., PCIe, InfiniBand, or "IB," Generation Z, or "GenZ") such that the logically bound components (in part or full) function as an equivalent PC Server (a logical server).

As described in greater detail below, this functionality can be provided using a single interface, for example, an environment application program interface (API) that can provide the ability to control environment functionality (e.g., composition, binding, software license agreement (SLA) enforcement) through and single interface and facilitate the use of resource adapters (RAs) that provide interfaces to individual modules within the computation environment. Thus, functionally, the composable environment can be treated as a single configurable device that is accessible by a single interface.

In some embodiments, multiple parallel interconnect fabrics can be utilized to provide a single integrated fabric that can provide resiliency, redundancy and/or parallelism beyond that of the individual parallel interconnect fabrics. The individual physical interconnects can be managed by their own managers and protocols, and can be fully addressable so that each RA can be reached by other RAs. Thus, the RAs can be considered "multi-homed" to each of the parallel interconnect fabrics to provide an interface to each interconnect fabric. Thus, the physical interconnect fabrics can be managed by their own native managers and protocols and RAs can be reached by any other RA in the environment and can provide hardware failover functionality. In some embodiments, individual physical interconnect mangers can be clustered to provide a single interface to the integrated fabric.

As described in greater detail below, RAs can communicate with each other and bind together using the appropriate addressing scheme for the underlying physical fabric (e.g., Ethernet can utilize MAC addresses, PCIe can utilize bus device functions). The single management structure (and corresponding interface) can be used to communicate with various RAs how to bind together within the composable environment.

These mechanisms and structures can allow a system administrator (or other entity) to describe a desired functionality at a relatively high level using the API and the underlying management entities and supporting hardware within the environment can provide the desired functionality. Further, the configuration of the environment can be updated/changed using the API when conditions or needs change.

In various embodiments, the composable architecture described herein can provide the functionality to logically bind simple components, for example, a compute module (e.g., processor(s), memory), to IO modules (e.g., Peripheral Component Interconnect Express, or "PCIe," Graphics Processing Units, or "GPUs," Network Interface Cards, or "NICs," Storage Controllers, Expansion Memory, Non-Volatile Memory Express, or "NVMe") across a carrier switching fabric (e.g., PCIe, InfiniBand, or "IB," Generation Z, or "GenZ") such that the logically bound components (in part or full) function, for example, as an equivalent PC Server (a logical server).

In various embodiments described herein, a parallel interconnect fabric based on Peripheral Component Interconnect (PCI)-compliant interfaces can provide configurable, fault-tolerant interconnections between multiple resources and computing nodes. Subsequent PCI standards can also be used. For example, related standards such as Compute Express Link (CXL) can be utilized with the techniques and architectures described herein. CXL is an open standard high-speed processor-to-device and processor-to-memory interconnect standard provided by Compute Express Link Consortium of Beaverton, Oregon. Similarly, Gen-Z interconnect standards can be supported. Gen-Z standards are provided by Gen-Z Consortium.

In the embodiments described, the improved functionality can be accomplished via use of one or more resource adapters (RAs— illustrated as, for example, an application-specific integrated circuit, or "ASIC" module). In one example embodiment, RAs can be configured in one of three modes: 1) compute-RA (C-RA); 2) target-RA (T-RA); and 3) the stacking-RA (S-RA). Compute RAs (e.g., computational resources adapters) or Target RAs (e.g., Target I/O resources adapter) can provide hardware protocol linkages bridging between the module local interconnect (e.g., PCIe, CXL) and the carrier switching fabric (e.g., PCIe, IB, GenZ).

In the various embodiments described herein, each RA provides a single control surface (i.e., programming interface) that enhances the carrier switching fabric capability, for example, using PCIe switches, into a hardware resilient (e.g., hardware failover, that is, no upper-level management software is needed to orchestrate failover) fabric on multiple isolated and independent paths to provide a parallel interconnect fabric. In addition, RAs can be capable of enhancing the carrier switching fabric capability providing end-to-end fabric quality of service (QoS) with, for example, cryptographic isolations between bindings and logically bound resources, for example, logical servers that can be linked with an external cryptographic key management service.

Further, in other embodiments, bindings can extend into standard intelligent infrastructure resources such as traditional PC servers or storage arrays, providing flexible I/O expansion or peer-to-peer communication across this parallel interconnect fabric. For example, each isolated fabric can be managed independently by their own fabric managers but orchestrate together as a clustered set providing a single unified interface and experience.

As a result of fabric independence, the fabric type or fabric latency are not required to be identical. As a result, parallel fabrics only require fabric node addressability (e.g., to the RAs) to be reachable on the fabric. In some embodiments, when parallel interconnect fabrics grow or extended to provide expandability, a stacking-RA (S-RA) can be used to bridge between the two parallel interconnect fabric domains. That is, for example, a fabric branch of parallel-interconnect-fabric-A domain is connected to a fabric branch in parallel-interconnect-fabric-B domain using a S-RA to resolve addressing resolution and quality of service (QoS) considerations within the targeted parallel fabric domain.

In some configurations, all of the parallel interconnect fabric domains together with the same fabric node addressability to RA domain can be referred to as infrastructure resource pool that can be independent of the number of parallel interconnect fabrics. As a result of the use of programmatic bindings, all resources can be managed in a real-time in an on-demand manner supporting modern intelligent applications that require new resources be bound to them (compute resource) or the creating of new compute resources, logical server nodes. In addition, unused resources can be released by intelligent applications back to into the free pool to be reallocated.

The modularity described can be provided, for example, because input/output (I/O) components need not be constrained within the physical device that they support, computational nodes, resources, switches and routers can all be dynamically added to the architecture and the various components can be interconnected over any distance (e.g., chip-to-chip, board-to-board, via copper cable, via fiber cable, over the Internet). In various embodiments, application-transparent alternate path partitioning can provide independence and fault isolation. Further, a single management footprint can be provided.

Conceptually, the architecture can be considered PCI-based middle management of I/O devices including, for example, NVMe memory devices and/or PCIe memory devices. Further, the architecture described herein can function to provide fault tolerance for non-fault tolerant devices and to provide redundancy for PCIe-based systems (or other interconnect architectures that do not provide native redundancy). That is, the architecture described herein provides I/O resiliency in systems that do not natively support fault tolerance and I/O resiliency.

For example, PCIe is based on a point-to-point topology with separate serial links connecting each device to the hosts. However, the PCIe standards to not provide native support for fault tolerance in response to failure of a link. Further, providing fault tolerance by providing redundant links results in an inefficient use of resources. Thus, the techniques and mechanisms described herein can allow mature, widely deployed technologies like PCIe to be utilized to provide improved, more efficient, more advanced architectures.

In some embodiments, a first switch fabric routes packets between compute resources and I/O resources. The compute resources each have a compute resource adapter (C-RA) to configure a header of a packet with a destination identifier with corresponding first frame identifier and a source identifier with corresponding second frame identifier. The I/O resources each have a target resource adapter (T-RA) to manage the packet based on the header. A second switch fabric also routes packets between the compute resources and the I/O resources.

One or more fabric managers can be coupled with the first switch fabric and the second switch fabric to route packets in parallel over both the first switch fabric and the second switch fabric when packet transmission failures are below a preselected failure rate and to dynamically reconfigure routing of packets over the first switch fabric and the second switch fabric in response to the packet transmission failures exceeding the preselected failure rate. The fabric manager(s) can also be utilized to provide a more sophisticated allocation of available resources by supporting and managing a composable computing environment.

FIG. 1 is a block diagram of one embodiment of a composable computing environment having a single parallel interconnect fabric. The example of FIG. 1 configures one or more logical servers from resources of the composable computing environment; however, this is but one example of the types of configurations that can be supported.

In the example of FIG. 1, composable resource manager 120 (which can be a cluster of composable resource managers) can provide management connectivity for control of parallel interconnect fabric(s) 110, and for compute module(s) 150 and target module(s) 160. In some implementations, composable resource manager 120 can also have management connectivity (e.g., 154, 164) to the Resource Adapters (RAs) in the compute and target modules (e.g., 152, 162), but in the example of FIG. 1, RAs 152 and 162 are controlled through parallel interconnect fabric (PIF) 110 through APIs from fabric management modules (e.g., 130, 135, 138). Parallel interconnect fabric 110 can include any number of fabric structures (e.g., 112, 114, 116) with fabric management modules (e.g., 130, 135, 138).

In the example of FIG. 1, the user interface is represented by API/GUI/Script 125 to the Composable Resource Manager. In one embodiment, the Composable Resource Manager-to-API/GUI/Script interface can provide information, health status and control for the entire topology of parallel interconnect fabric 110 to the attached compute and target modules (e.g., 150, 160). In one embodiment, composable resource manager API 125 will include information, health status and control of PIF 110, and may include information, health status and control of each RA connected to PIF 110, as in the case for the example of FIG. 1.

In one embodiment, composable resource manager 120 directly manages the RA modules (e.g., 152, 162), via one or more APIs specific to the information, health status and control of the different RAs. In one embodiment, composable resource manager 120 is also able to associate each RA with either a compute module (e.g., 150) or a target module (e.g., 160). In the example of FIG. 1, composable resource manager 120 has a management connection to compute module 150 and target module 160, and the API on these connections provides information on the module identity, inventory of the module including the identity of the fabric RA, and other resources within the module.

One example of a management entity that can provide information, health status and control in compute module 150 or target module 160 is a Baseboard Management Controller or BMC. In one embodiment, composable resource manager 120 can discover the parallel interconnect fabric(s) 110 through management connections (e.g., 122, 126, 128) to the Fabric Managers (e.g., 130, 135, 138) including, for example, the complete connection topology to all RAs.

The Composable Resource Manager discovers the association of each Resource Adapter with the Parallel Interconnect Fabric and the hosting Compute or Target Module through either the Fabric Manager(s) or through the management connection to each Compute or Target Module management API. In one embodiment composable resource manager 120 can also discover resources within each compute or target module in order to build a complete inventory of resources and parallel interconnect fabric topology, and may store this information in database 140, in memory or some combination thereof.

In one embodiment, user interface 125 to composable resource manager 120 can query information and health status on the entire topology, or request a change in the resource(s) for any compute module. Composable resource manager 120 can respond to a requested resource addition or subtraction by identifying resource(s) that can be reconfigured on parallel interconnect fabric to meet the request and complete the reconfiguration, or respond that the request cannot be satisfied, or that an error occurred during the operation.

In the example of FIG. 1, one or more logical servers 170 can be configured as described above. The logical server configuration example of FIG. 1 is a PCIe-based configuration; however, as discussed above, various other protocols can be supported. Each logical server can have include one or more processing resources 172 (from one or more processor modules 150), logical PCIe switch 175 (from parallel interconnect fabric 110) and any number of logical PCIe devices 180, 184, 188 (from one or more target modules 160).

Figure 2:
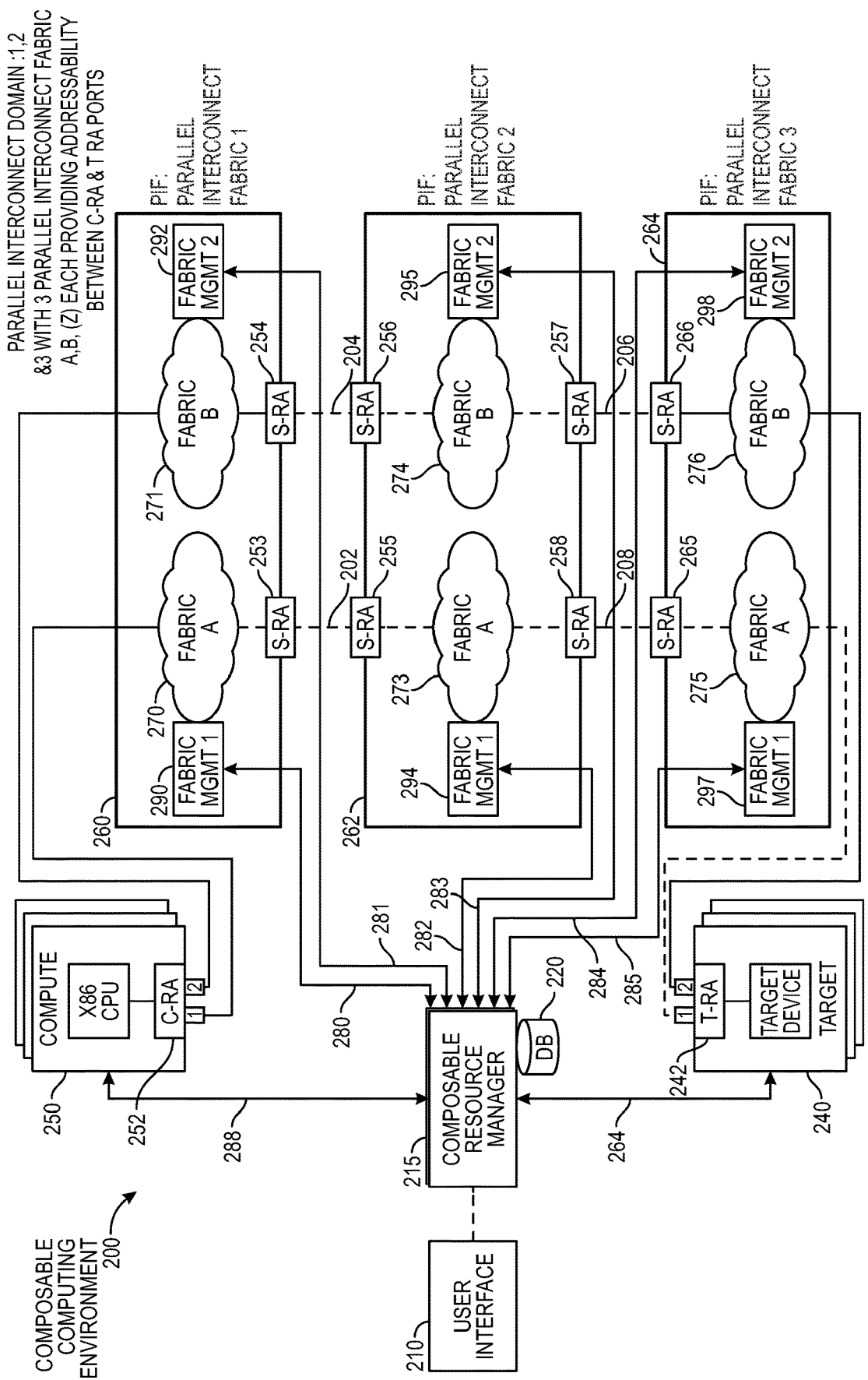
FIG. 2 is a block diagram of one embodiment of a composable computing environment having stacked interconnect fabrics.

FIG. 2 is a block diagram of one embodiment of a composable computing environment having stacked interconnect fabrics. The example of FIG. 2 configures one or more logical servers from resources of the composable computing environment; however, this is but one example of the types of configurations that can be supported.

The composable computing architecture of FIG. 2 includes three types of RAs (that are described in greater detail below): compute resource adapter (C-RA), target resource adapter (T-RA), stacking resource adapter (S-RA). In addition to the various types of resource adapters, one or more fabric modules and corresponding fabric managers can provide composable interconnectability.

At a high level, in one embodiment, the architecture of FIG. 2 can utilize an end-to-end credit based flow control (e.g., between one or more compute resources and one or more target resources). The example embodiment of FIG. 2 provides three example types of parallel interconnect fabrics: 1) parallel interconnect fabric 1 (260) that provides interconnections between one or more compute resources and another parallel interconnect fabric; 2) parallel interconnect fabric 2 (262 that provides interconnections between other parallel interconnect fabrics; and 3) parallel interconnect fabric 3 that provides interconnections between one or more target resources and another parallel interconnect fabric. Use of any number of any of these types of parallel interconnect fabrics can be supported. The stacked architecture as illustrated in FIG. 2 provides more functionality and more flexibility than the non-stacked architecture of FIG. 1.

Various distances can be supported by providing interconnections at the chip-to-chip level, board-to-board level, copper cabling, fiber cabling, or any combination thereof. Thus, dynamic addition and removal of end nodes, switches and/or routers can be supported.

In various embodiments, stacking links (e.g., 202, 204, 206, 208) can be any type of interconnecting link, for example, copper, fiber optic, can be utilized between S-RAs (e.g., 253, 254, 255, 256, 265, 266). That is, the stacking links can be a different type of interconnection than the interconnection fabric links.

In the example of FIG. 2, composable resource manager 215 can be a cluster of composable resource managers and have management connectivity for control of parallel interconnect fabrics 260, 262 and 264, and compute module(s) 250 and intelligent target modules 260 shown (e.g., 280, 281, 282, 283, 284, 285, 288, 289). In some implementations, composable resource manager 215 can also have management connectivity to the RAs in compute modules 250 (e.g., 252) and target modules 260 (e.g., 262), but in this example, the RAs are controlled through parallel interconnect fabrics 260, 262, 264 through APIs from fabric management modules.

In one embodiment, user interface 210 can be API/GUI/Script to composable resource manager 215. In one embodiment, the composable resource manager-to-API/GUI/Script interface provides information, health status and control for the topology of any number of parallel interconnect fabrics (e.g., 260, 262, 264) to all attached compute modules 250 and target modules 260. In one embodiment, the composable resource manager API to the parallel interconnect fabric manager(s) can include information, health status and control of that fabric, and may include information, health status and control of each RA connected to that fabric.

In one embodiment, composable resource manager 215 can directly managing RA modules (e.g., 250, 260), this can utilize an API specific to the information, health status and control of the different RAs. In one embodiment, composable resource manager 215 can function to associate each RA with either a compute module or a target module.

In this example, composable resource manager 215 can have a management connection to compute module(s) 250 and target module(s) 260, and the API on these connections can be utilized to provide, for example, information on module identity, inventory of the module including the identity of the fabric RA, and other resources within the module. An example of a management entity that can provide information, health status and control in a compute module or target module is a Baseboard Management Controller or BMC.

In one embodiment, composable resource manager 215 can function to discover the parallel interconnect fabrics (e.g., 260, 262, 264) through management connections (e.g., 280 to 285) with fabric managers 290, 292, 294, 295, 297, 298 including the complete connection topology to all RAs. In one embodiment, composable resource manager 215 discovers the association of each RA with parallel interconnect fabrics 260, 262, 264 and hosting compute modules or target modules through either the fabric manager(s) or through the management connection to each compute module or target module management API.

In one embodiment, composable resource manager 215 also discovers the resources within each compute module or target module in order to build a complete inventory of resources and parallel interconnect fabric topology, and may store this information in database 220, in memory or some combination thereof. In one embodiment, user interface 210 to composable resource manager 215 can, for example, query information and health status on the entire topology, or request a change in the resource(s) for any compute module. In one embodiment, composable resource manager 215 can respond to a requested resource addition or subtraction by identifying resource(s) that can be reconfigured on parallel interconnect fabrics 260, 262, 264 to meet the request and complete the reconfiguration successfully, or respond that the request cannot be satisfied, or that an error occurred during the operation.

In various embodiments, each RA (i.e., C-RA or T-RA) is mapped to its own interconnect fabric address domain. Each S-RA bridges transaction between interconnect fabric address domains and therefore is a member of two interconnect fabric address domains.

Multiple resource modules can be interconnected via interconnection fabrics. In various embodiments, resource modules can have multiple RAs that can provide different types of resources to the compute modules. The example of FIG. 2 can include, for example, smart I/O modules that can include multifunction devices, smart I/O modules that can include multi-host devices, I/O modules that can include interfaces to receive pluggable resources, or memory modules. In other embodiments, different types of resources and/or different numbers of resources can be supported.

The example architecture of FIG. 2 can provide several advantages over current architectural strategies. At a high level, the architectures described herein utilize a composable fabric that enables platform disaggregation to facilitate modular compute resources and modular I/O resources that can be dynamically configured to meet various needs. Thus, I/O scaling can be provided to meet changing needs from the compute resources. Further, I/O utilization can be more efficient as I/O resources can be shared between compute resources sequentially or concurrently. In some embodiments, peer-to-peer connections between resource modules, which can provide more efficient utilization of compute node resources.

In example embodiments, I/O modules can include one or more dual-port NVMe devices that can be coupled to two RAs. Thus, the dual-port functionality of the NVMe devices can be utilized within the composable computing architectures. Various embodiments and configurations utilizing NVMe devices are described in greater detail below.

In various embodiments, fabric managers can control the flow of traffic through the interconnection fabrics to take advantage of parallel paths to the extent possible when sufficient capacity is available, and to reroute traffic with reduce parallelism when one or more links are unavailable. In some embodiments, the functionality provided by the fabric managers is supported by the encapsulation and additional information provided by the various resource adapters. In the example embodiment, each frame type includes one or more interconnection fabrics with corresponding fabric manager.

The architecture described herein can provide hardware failover for PCIe cards and NVMe drives over the interconnection fabric. Also, the architecture can provide quality of service (QoS) controls for fabric bandwidth and throughput. The example architecture defines QoS as a "unit-of-consumption" for a shared resource, either sharing concurrently (simultaneously) or sequentially (one-at-a-time), as part of a logical server. For the interconnect fabric, sharing is concurrent, with a unit-of-consumption based on the use of interconnect fabric end-to-end flow control credits. In one embodiment, the use of end-to-end flow control credits restrict each RA from injecting new transaction, or network packets, into the interconnect fabric, until available credits have been accumulated (acknowledged packets) for any outstanding transactions, network packets previously inserted into the network.

In one embodiment, for T-RAs, QoS "unit-of-consumption" also includes the target IO resource device, either as sequential for any mapping of a target I/O device in full (e.g., PCIe device (all the PCIe devices PF-physical function)), in a PCIe adapter device, in a PCIe GPU device, or in a PCIe NVMe device. In addition to sequential mapping of the target device, the T-RA can also map target I/O resources concurrently, that is fabric bindings in some portion of the IO resource/device (e.g., one PCIe PF-physical function in a PCIe multi-function device or a PCIe PF-virtual function in a PCIe device supporting many VFs within its PF(s)).

In some embodiments, for all T-RAs, the target I/O is either bound to a C-RA creating a logical server or to another T-RA for peer-to-peer transaction when the same target resources are also bound to the same C-RA logical server. In one embodiment, a logical server hosting a hypervisor software stack can simply map the processor I/O memory management unit (IOMMU) into the C-RA to group the C-RA's T-RA bindings such that they are hardware isolated between the VM instances, within the same logical server. Furthermore, each RA QoS can be allocated based on logical server type, class, supporting IO target resource bindings for peer-to-peer transaction, including transactions (network packets) flowing through S-RA stacking nodes. Also, the architecture can provide an attestable infrastructure for improved security.

In various embodiments, RAs provide a physical interface between a resource (e.g., compute, memory module, NVMe device) and a PCIe-based interconnect fabric. In addition to providing encapsulation (and possibly other data formatting) services, the RAs can include a state machine that functions to support flow control functionality and failover functionality by further encapsulating the PCI-based traffic. Similarly, compute resource adapters (C-RAs) provide RA functionality for compute resources such as, for example, a processor core.

In some embodiments, multiple parallel connection fabrics can be provided that can function to provide parallel interconnection fabrics when fully functional, and to provide failover capacity when some portion of the interconnection fabrics are not functional. That is, when fully functional multiple parallel paths between compute modules and resources can be provided, but when a portion of one of the fabrics fails, the overall interconnection configuration can be dynamically rearranged to compensate for the failure without utilizing a primary-backup type functionality.

Figure 3:
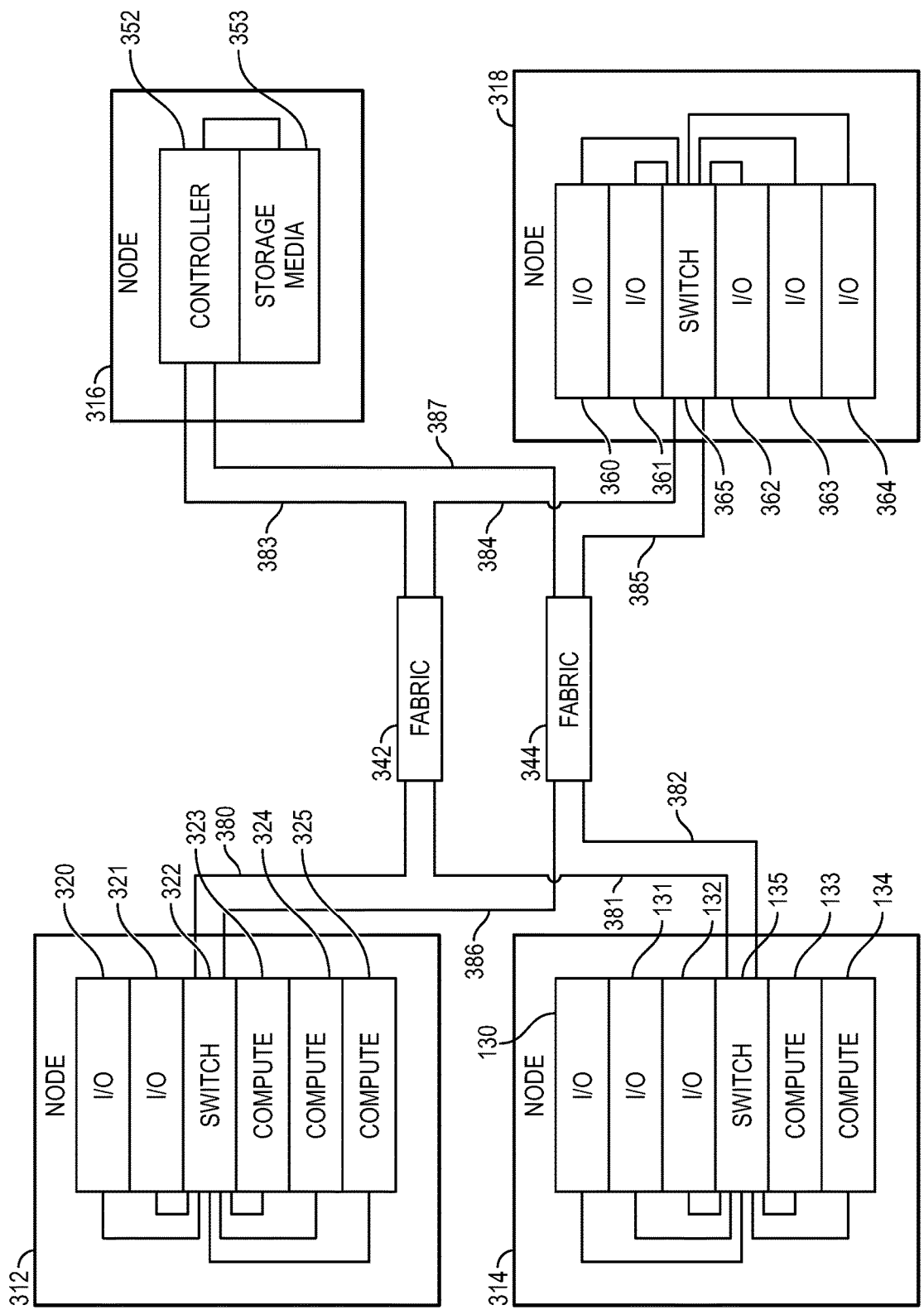
FIG. 3 is a logical representation of one embodiment of an architecture that can provide flexible, configurable systems utilizing parallel interconnect fabrics.

FIG. 3 is a logical representation of one embodiment of an architecture that can provide flexible, configurable systems utilizing parallel interconnect fabrics. The example of FIG. 3 includes a small number of components; however, more complex systems with any number of components can be supported. The example of FIG. 3 can be a PCI-based system in which PCIe, for example, components are utilized.

In the example of FIG. 3, node 312 includes input/output (I/O) target resource devices (e.g., 320, 321) and compute resource nodes (e.g., 323, 324, 325) coupled with switch 322. I/O devices can be, for example, storage devices, memory systems, user interfaces, and compute nodes can be one or more processors (or processor cores) that provide processing functionality. Switch 322 functions to interconnect I/O devices 320 and 321, and compute devices 323, 324 and 325. In some embodiments, these components can be co-located as node 312; however, in other embodiments these components can be geographically distributed.

Node 314 is similarly configured with switch 335 interconnecting I/O devices (e.g., 330, 331, 332) and compute devices (e.g., 333, 334). Node 318 is an I/O node having multiple I/O devices 360, 361, 362, 363, 364 interconnected through switch 365. Node 316 is a control node that includes controller 352 and storage media 353 that can function to control the architecture of FIG. 3. Switches 322, 335 and 365 from various nodes can provide interconnection and further can be interconnected by multiple parallel interconnection fabrics (e.g., 342, 344). In various embodiments, switches 322, 335 and 365 and interconnection fabrics 342 and 344 are PCIe based interconnects as described in greater detail below. In alternate embodiments, CXL or Gen-Z based interconnects can also be utilized in alternate embodiments.

During normal operation, interconnection fabric 342 and interconnection fabric 344 may provide parallel paths between the various nodes to provide maximum available bandwidth. In the event of a failure of some or all of one of the interconnect fabrics, the overall interconnection between nodes can be reconfigured to compensate for the failure. That is, the multiple parallel interconnection fabrics are not configured as a primary fabric and a backup/standby fabric but are controlled and configured to provide optimal interconnection bandwidth under the control of one or more fabric managers. This functionality is described in greater detail below.

The example modular and composable architecture illustrated in FIG. 3 can provide modularity in that I/O resources need not be constrained inside any specific physical system. Further, consolidation of, for example, storage, cluster traffic and/or I/O devices can be provided. The example modular and composable architecture also provides high availability by allowing application-transparent alternate pathing, partitioning for independence, fault isolation, and a single management footprint.

Figure 4:
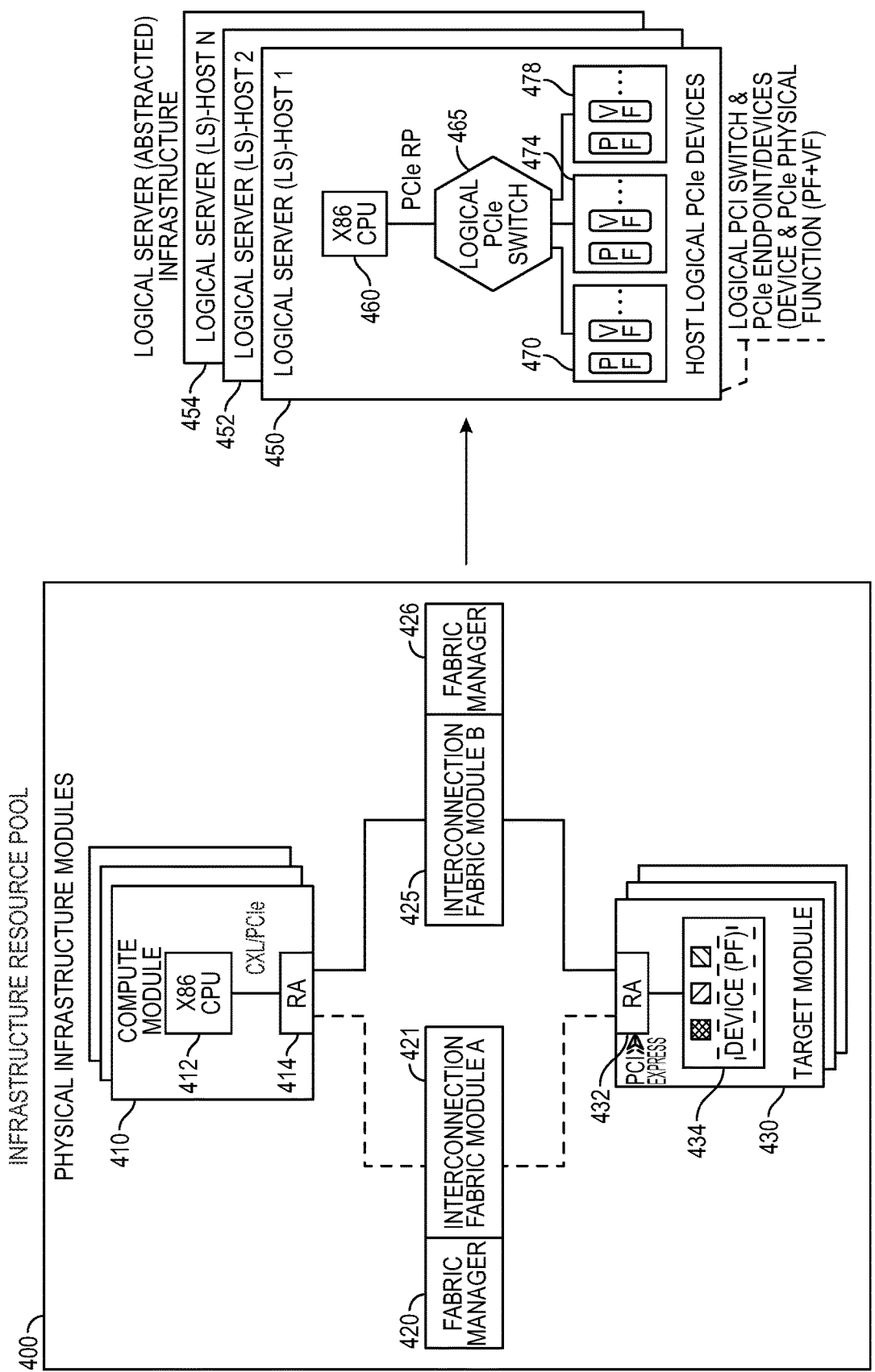
FIG. 4 is a conceptual diagram of one embodiment of an infrastructure resource pool providing composable resources from which resource instances or full devices can be bound together and configured to create logical servers that operate as traditional servers.

FIG. 4 is a conceptual diagram of one embodiment of an infrastructure resource pool providing composable resources from which resource instances or full devices can be bound together and configured to create logical servers that operate as traditional servers. FIG. 4 provides one example use case for mapping physical and virtual functions provided by compute modules and target modules to achieve a logical server architecture. This figure shows both Physical Infrastructure with parallel fabrics and the Logical Infrastructure, where the parallel fabrics are invisible and only mapped resources are visible to a server.

Infrastructure resource pool 400 includes the various physical infrastructure modules as discussed above in FIG. 2. In the example embodiment of FIG. 4, this includes compute modules 410 each having one or more processing cores 412 and corresponding C-RAs 414. Processing cores 412 can be connected to C-RAs 414 utilizing CXL or PCIe protocols, for example. Processing cores 412 can be any type of processing resource, for example, a central processing unit (CPU), a graphics processing unit (GPU), etc.

Infrastructure resource pool 400 further includes target modules 430 each having one or more Target/IO resources 434 the provide a physical function (PF) and corresponding T-RAs 432. Resources 434 can be connected to T-RAs 414 utilizing CXL or PCIe protocols, for example. Processing cores 412 can be any type of resource that can be utilized to support processing cores 412, for example, memory modules, smart I/O modules, etc.

Interconnection fabrics 421 and 425 with associated fabric managers 420 and 426, respectively, can function to provide configurable interconnections between C-RAs 414 and T-RAs 432, which provides interconnections between compute modules 410 and target modules 430. In some embodiments the interconnection fabrics are PCIe-based interconnection fabrics. In alternate embodiments, the interconnection fabrics are CXL or Gen-Z based interconnects.

In various embodiments, utilizing interconnection fabrics 421 and 425 with fabric managers 420 and 426, the modules from infrastructure resource pool 400, various computing architectures can be composed. The example of FIG. 4 illustrates a set of logical servers (e.g., 450, 452, 454). While the configuration illustrated in FIG. 4 is that of the same logical device type (i.e., logical servers); the functionality described is not limited to multiples of the same logical device type. Thus, in alternate embodiments, many different concurrent logical device types can be configured.

In the example configuration of FIG. 4, each logical server includes at least one processor resource 460, which are some or all of the compute modules 410 (i.e., processor 412 and corresponding C-RA 414) from infrastructure resource pool 400. Some or all of interconnection fabrics 421 and 425 can be configured (via fabric managers 420 and 426) to provide logical PCIe switch 465. In alternate embodiments, based on CXL or Gen-Z, for example, the logical switch would be based on the appropriate protocol.

Further, each logical server includes at least one logical resource 470, 474, 478, which are some or all of the target modules 430 (i.e., resources 434 and corresponding T-RA 432) from infrastructure resource pool 400. Once configured, logical servers 452, 452 and 454 can provide server functionality with the allocated resources. As conditions change, one or more of logical servers 450, 452 and 454 can be reconfigured as logical servers with different resource allocations, as other logical device types, or deconfigured with the resources being reallocated to infrastructure resource pool 400.

Figure 5:
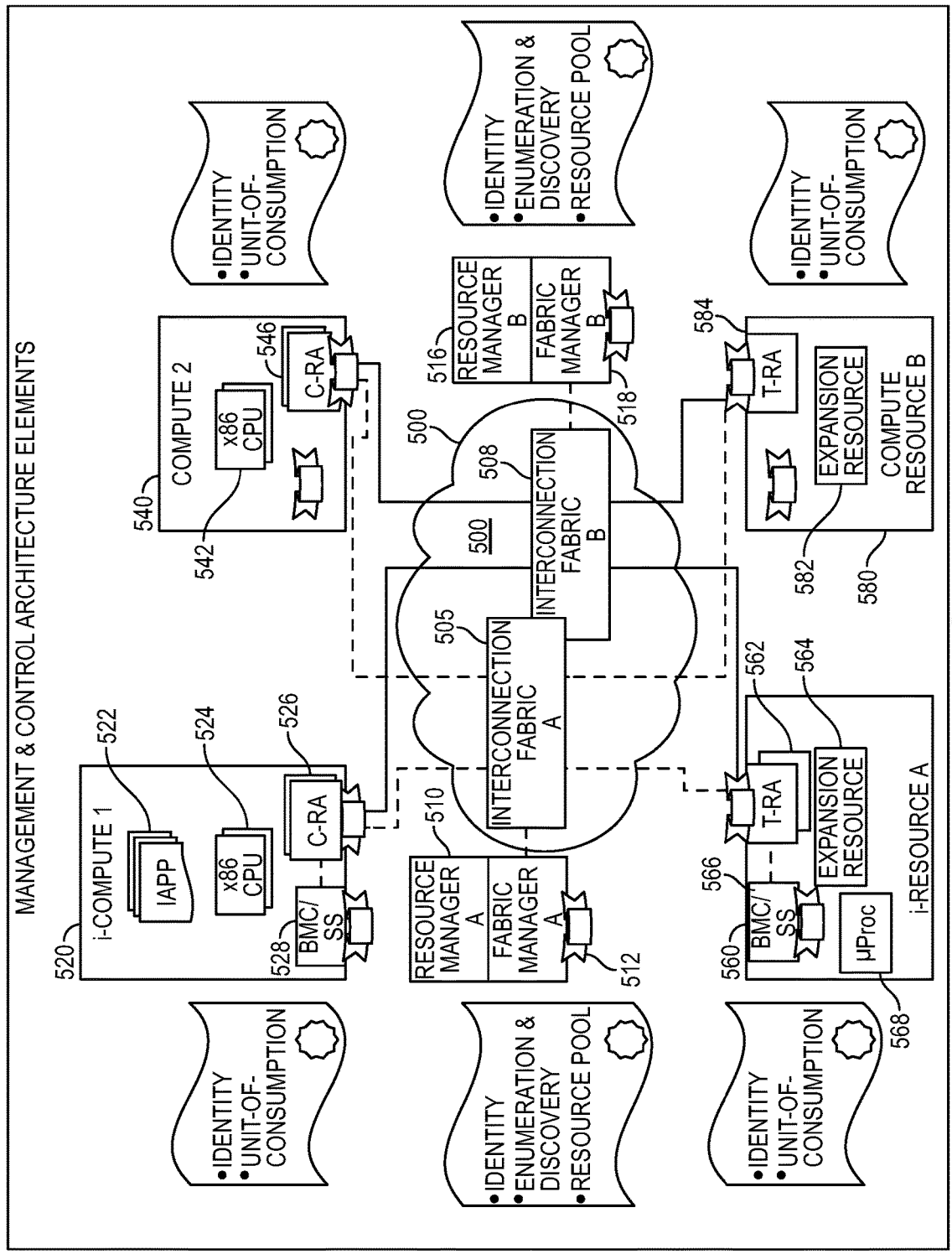
FIG. 5 is a block diagram of one embodiment of a trusted composable computing architecture of trusted composable infrastructure resources having intelligent modules, simple modules and parallel interconnect fabrics from which server modules can expand their 10 capabilities or to create logical server.

FIG. 5 is a block diagram of one embodiment of a trusted composable computing architecture of trusted composable infrastructure resources having intelligent modules (e.g., a server, a storage array), simple modules (e.g., a CPU, a PCIe adapter, a NVMe drive) and parallel interconnect fabrics from which traditional server modules (intelligent modules) can expand their IO capabilities or to create logical server. The architecture of FIG. 5 can be a fully-attestable infrastructure and can provide full encryption and key management isolation services. The architecture of FIG. 5 can further provide fabric health monitoring and reporting as well as compliance and security services and modes.

The example of FIG. 5 illustrates how compliance and security can be added to the system at each of the management endpoints including for example the composable resource manager, fabric manager(s), resource adapter(s) and baseboard management controller(s). This compliance and security is illustrated with a "bowtie" symbol on each endpoint. This "bowtie" indicates the endpoint provides authentication, attestation, and encryption key management services.

The architecture illustrated in FIG. 5 utilizes expansion fabrics 505 and 508 that function as described above. Expansion fabrics 505 and 508 can be PCIe-based or, alternatively, CXL or Gen-Z based fabrics. Fabric managers 512 and 518 can function to configure connections within expansion fabrics 505 and 508, respectively, to provide the composable functionality as described herein. Resource managers 510 and 516 can provide resource configuration management functionality for one or more compute resource and/or one or more target resources. In alternate embodiments, any number of expansion fabrics, fabric managers and resource managers can be supported. In some embodiments, fabric managers 512 and 518 can provide identity, enumeration and discovery, and resource pool authentication services. The configuration of FIG. 5 can provide high availability management via the resource managers.

The architecture illustrated in FIG. 5 can utilize compute resources (e.g., 540) that include processor resource(s) 542 and C-RA(s) 546. In some embodiments, C-RA(s) 546 can provide identity and/or unit-of-consumption authentication services. In some embodiments, one or more intelligent compute resources 520 can be included. Intelligent compute resources include at least one app 522 that provides some level of intelligence for intelligent compute resource 520 as compared to compute resource 540. In addition to app 522, intelligent compute resource 520 can include one or more processor resources 524 and one or more corresponding C-RAs 526. Intelligent compute resource 520 can also include authentication agent 528 to provide the identity and/or unit-of-consumption authentication services for intelligent compute resource 520.

Various embodiments of a composable compute architecture as illustrated in FIG. 5 can include simple expansion resource 580 having expansion resource 582 and T-RA 584. Expansion resources can include, for example, SmartIO modules, NVMe modules, etc. In some embodiments, C-RA(s) 584 can provide identity and/or unit-of-consumption authentication services. In some embodiments, one or more intelligent expansion resources 560 can be included. Intelligent expansion resources include at least one processing element 568 that provides some level of intelligence for intelligent expansion resource 560 as compared to simple expansion resource 580. In addition to processing element 568, intelligent expansion resource 560 can include one or more expansion resources 564 and one or more corresponding T-RAs 562. Intelligent expansion resource 560 can also include authentication agent 566 to provide the identity and/or unit-of-consumption authentication services for intelligent expansion resource 560.

In general, the architecture of FIG. 5 illustrates how layers of security and attestation functionality can be provided to composable architecture modules. This additional functionality can support enumeration and discovery functionality including, for example, walking the interconnect (e.g., link-by-link in a PCIe embodiment). Further, resource bindings, for example RA fabric binding (host-to-target, target-to-target) as well as I/O target bindings (e.g., logical memory ranges, logical NVMe devices, dual-path NVMe devices to a single host, physical PCIe adapter) can be supported.

The authentication functionality provided by the architecture of FIG. 5 can result in secure management and control with mutual authentication and a fully encrypted fabric data path providing cryptographic isolation between bindings/logical-servers. Further, hardware failover for a trigger event or a software control (e.g., scheduled event) can be supported. Controller fail back can be software controlled with path validation and clearing of error conditions.

Figure 6:
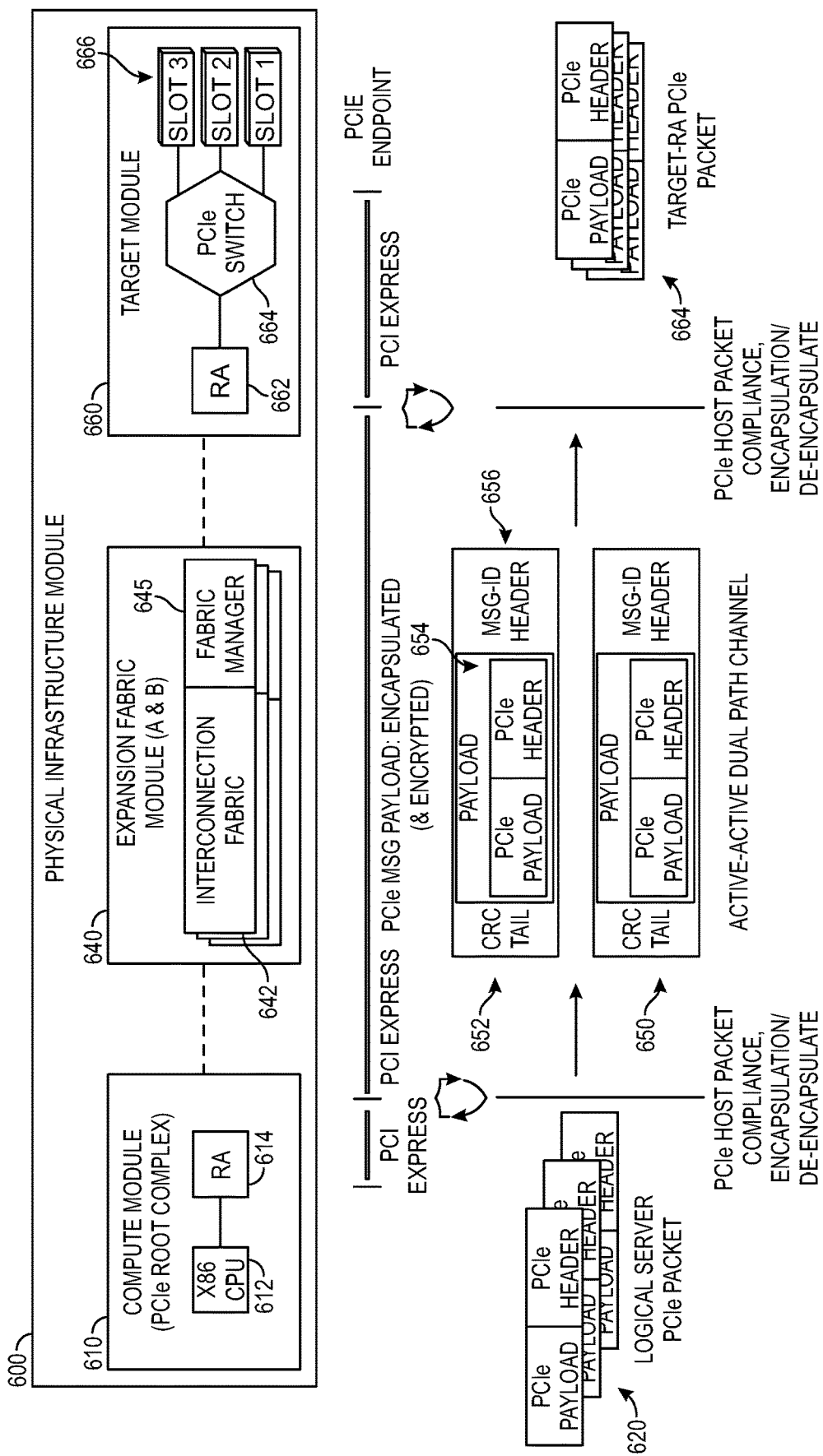
FIG. 6 is a block diagram of one embodiment of an infrastructure resource pool providing composable infrastructure resources in a hardened secure environment where logical server resource bindings are cryptographically connected over the parallel interconnect fabric.

FIG. 6 is a block diagram of one embodiment of an infrastructure resource pool providing composable infrastructure resources in a hardened secure environment where logical server resource bindings are cryptographically connected over the parallel interconnect fabric. In the example of FIG. 6, infrastructure resource 600 can include any number of compute modules 610, interconnection modules 640 and target modules 660.

As with the configurations discussed above, compute module(s) 610 can include one or more processors 612 and corresponding C-RAs 614. Interconnection module 640 can include one, two or more interconnection fabrics 642 and corresponding fabric managers 645. The example target module(s) 660 of FIG. 6 can include one or more T-RAs 662 and corresponding switches 664 to provide access to various PCIs slots 666. Other target module configurations that provide different functionality can also be supported.

In the architecture illustrated in FIG. 6, C-RAs 614 and T-RAs 662 function to provide PCIe host packet compliance as well as encapsulation/de-encapsulation functionality. In various embodiments, C-RAs 614 function to receive logical server PCIe packets 620 to encapsulated packets 650. Encapsulated packets 650 are transmitted over interconnection module 640 to T-RAs 662 that also provide compliance and de-encapsulation functionality. Traffic can flow in the opposite direction as well using the same procedures and protocols.

In one embodiment, encapsulated packets 650 include tail 652, payload 654 (e.g., one PCIe packet 620) and message header 656. In one embodiment, message header 656 includes a vendor ID, a requester ID (e.g., compute RA ID, target RA ID), a target ID, flow control credits and transaction ordering requirements. In alternate embodiments, different message header configurations can be used.

Thus, combination of the various elements as illustrated in FIGS. 1-6 and the corresponding description composable computing frameworks having various levels of security, encryption, cryptographic isolation of logical server bindings, attestation, etc.

Figure 7:
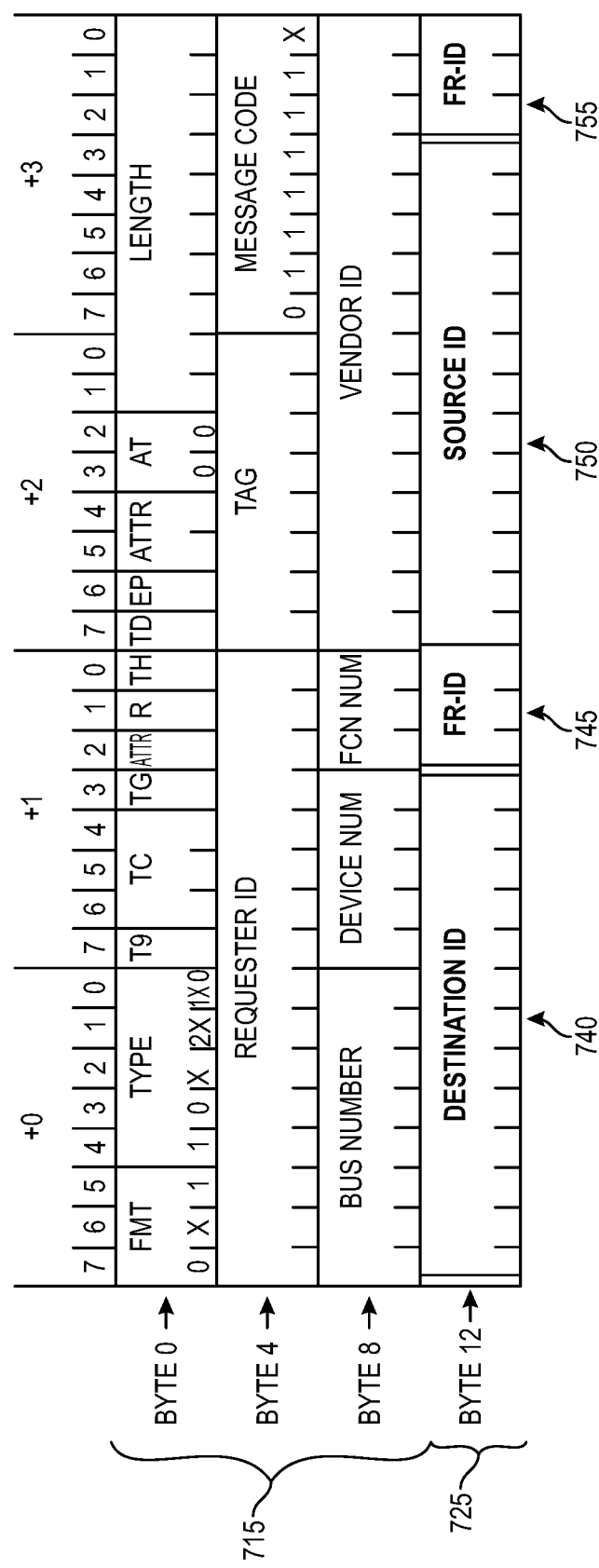
FIG. 7 is an example of a parallel interconnect fabric packet frame header that can be utilized with the composable architecture described herein, for a PCIe parallel interconnect fabric built using standard PCIe switches.

FIG. 7 is an example of a parallel interconnect fabric packet frame header that can be utilized with the composable architecture described herein, for a PCIe parallel interconnect fabric built using standard PCIe switches. The example of FIG. 7 is that of a PCIe Transaction Layer Packet (TLP) header utilizing the vendor-reserved bytes to support the composable fabrics and composable computing architectures as described herein; however, other protocols can utilize other header formats.

In the example format of FIG. 7, bytes 0 through 11 of the TLP header (815) can be as defined in the PCIe standards. In various embodiments, bytes 12 through 15 of the header (825) can be utilized to support the composable architecture described herein are available for this use because bytes 12 through 15 are reserved for vendor use by the current standards. Thus, as the standards evolve, the exact configuration of the headers may change but the functionality can be maintained by utilizing portions reserved for vendor use.

In various embodiments, the information in bytes 12 through 15 of the TLP header can be utilized by one or more of the RAs within the composable architecture. In one embodiment, bytes 12 and 13 of the header are utilized for a destination identifier (840) and a frame identifier (845). Similarly, bytes 14 and 15 of the header are utilized for a source identifier (850) and a frame identifier (855). Other header structures can be utilized to provide similar functionality.

In various embodiments, transactions that cross interconnect fabric address domains are updated by the S-RA with new S-RA ID (header byte 6+7 . . . Requester ID) and target-ID (header byte 10+11 . . . Bus & Device Num) allowing frames to flow independently between different interconnect fabric address domains. When the Bus Number & Device Number (byte 10+11) matches the Destination-ID (byte 14+15), the packet has arrived at its ultimate target, a C-RA or a T-RA attached to the destination interconnect fabric address domain.

In various embodiments each fabric can have a corresponding subnet and the frame ID (e.g., 745, 755) can be used to identify the frames and thus the corresponding address domains. In some embodiments, the frame ID can be utilized for routing packets using device IDs that can be reused. In some embodiments, routing tables and/or address translation tables can be utilized for traffic between frames.

Figure 8:
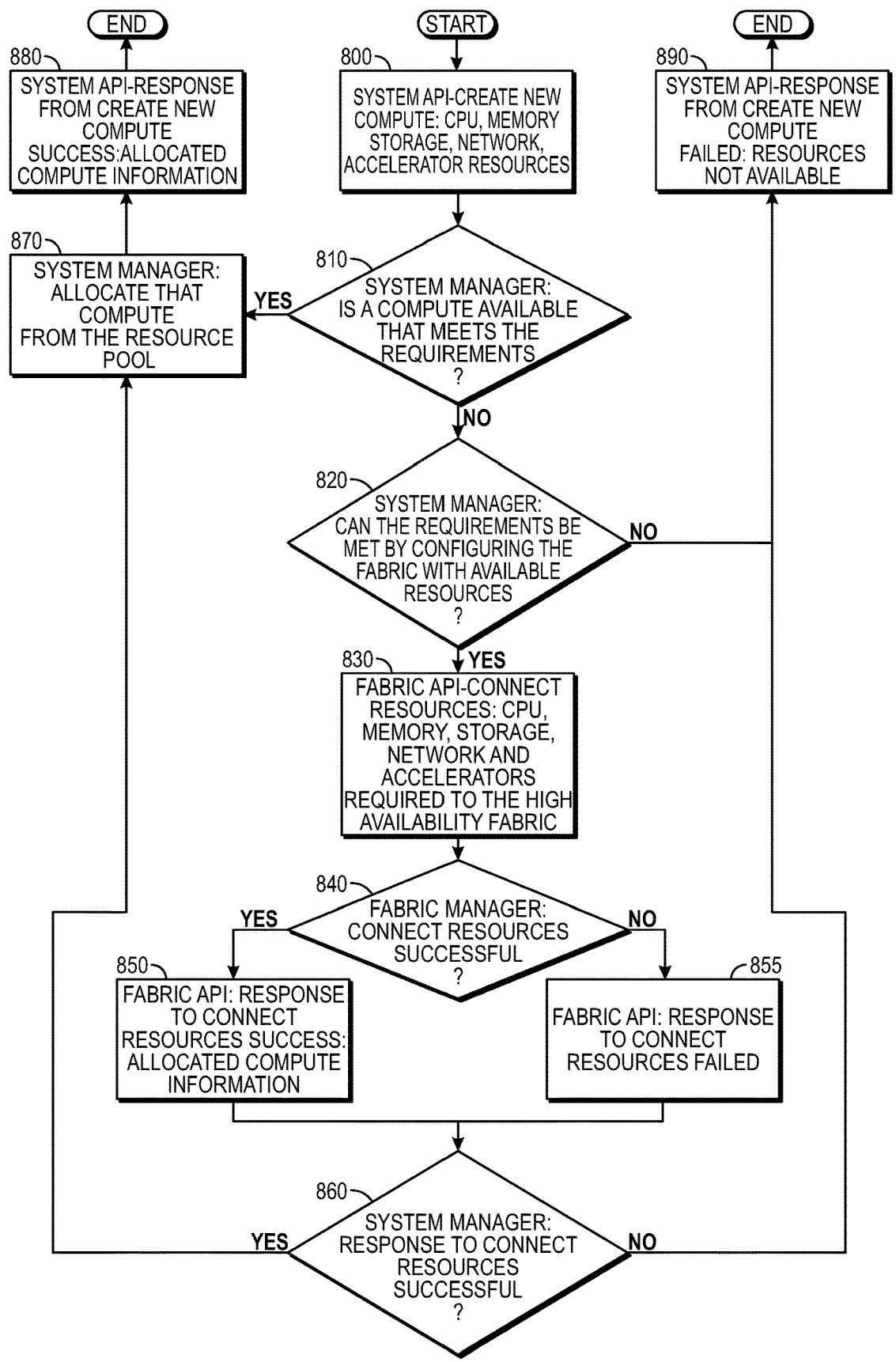
FIG. 8 is a flow diagram of one embodiment of a technique for configuring a computational infrastructure resource in an environment providing composable resources.

FIG. 8 is a flow diagram of one embodiment of a technique for configuring a computational infrastructure resource in an environment providing composable resources. The example flow of FIG. 8 describes one embodiment of how a composable resource manager (e.g., 215 in FIG. 2) can control one or more fabric managers (e.g., 290, 292, 294, 295, 297, 298 in FIG. 2) based on, for example, an API to provide a compute tailored to the API requirements using the composable fabric.

In one embodiment, the environment provides (or includes) an API that supports creation of a new compute resources, which can include, for example, processor(s), memory, storage, network and/or accelerator resources. This can be considered a "server profile." In alternate embodiments, additional and/or different resources can be supported. In one embodiment, one or more compute specifications are received via the API at block 800.

In one embodiment, a system manager (or other component, for example, one or more fabric managers) can evaluate the environment and determine if a compute resource is available that meets the requested requirements at block 810. If the compute resource is available, at block 810, the system manager (or other component(s)) can allocate the compute resource from the resource pool at block 870. When the compute resource is allocated, at block 870, a response can be provided via the system API at block 880. In one embodiment, the response indicates that the requested compute resource has been successfully allocated. In alternate embodiments additional information can also be provided.

If the compute resource is not available, at block 810, the system manager (or other component(s)) can determine if the requested requirements can be met by configuring available resources from the resource pool at block 820. If not, a failure response can be provided via the API at block 890. If the requested requirements can be met with the resource pool, a fabric API and/or fabric managers can function to connect the desired resources (e.g., processor(s), memory, storage, network) utilizing the RAs and other elements as discussed herein at block 830.

If the fabric manager(s) is/are successful at connecting the desired resources, at block 840, a response can be provided via the fabric API indicating the compute resources have been allocated at block 850. If the fabric manager(s) is/are not successful at connecting the desired resources, at block 840, a failure response can be provided via the fabric API indicating the compute resources have been not allocated at block 855.

Upon receiving a response via the fabric API, the system manager can determine whether the resource connection was successful at block 860. If not, a failure response can be provided via the API at block 890. If the resource connection was successful, at block 860, a response can be provided via the system API at block 880. In one embodiment, the response indicates that the requested compute resource has been successfully allocated. In alternate embodiments additional information can also be provided.

Figure 9:
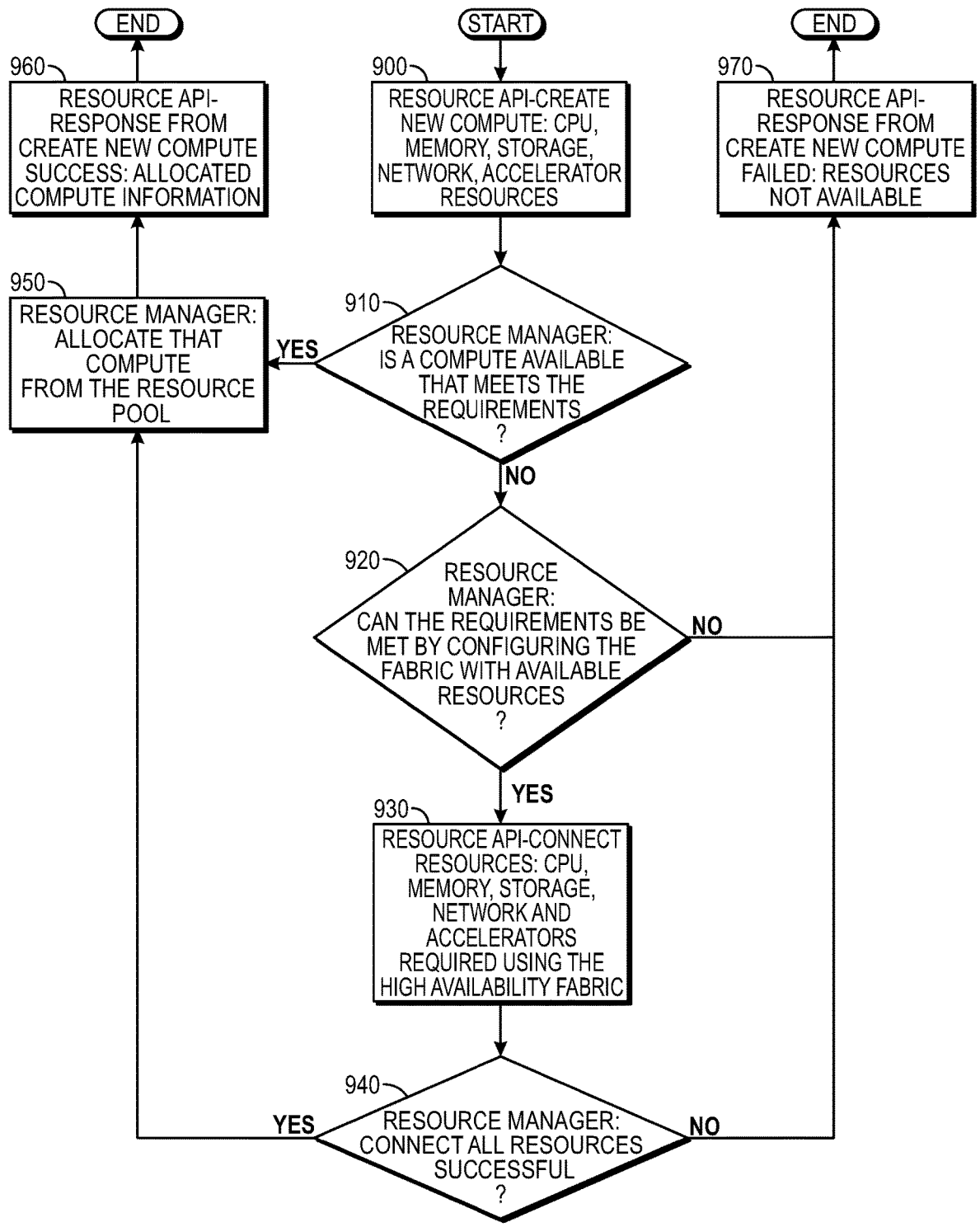
FIG. 9 is a flow diagram of one embodiment of a technique for configuring a computational resource in an environment providing composable resources.

FIG. 9 is a flow diagram of one embodiment of a technique for configuring a computational resource in an environment providing composable resources. The flow of FIG. 9 provides an example alternative to the flow of FIG. 8. In the example of FIG. 9, one or more resource managers (e.g., 510 and 516 in FIG. 5) can control one or more fabric managers (e.g., 512 and 518 in FIG. 5) based on, for example, an API to provide a compute tailored to the API requirements using the composable fabric. In this example the resource manager(s) communicate with other fabric switches as well as C-RAs and T-RAs to provide the desired configurations.

In one embodiment, the environment provides (or includes) a resource API that supports creation of a new compute resources, which can include, for example, processor(s), memory, storage, network and/or accelerator resources. In alternate embodiments, additional and/or different resources can be supported. In one embodiment, one or more compute specifications are received via the resource API at block 900.

In one embodiment, a resource manager (or other component, for example, one or more fabric managers) can evaluate the environment and determine if a compute resource is available that meets the requested requirements at block 910. If the compute resource is available, at block 910, the resource manager (or other component(s)) can allocate the compute resource from the resource pool at block 950. When the compute resource is allocated, at block 950, a response can be provided via the resource API at block 960. In one embodiment, the response indicates that the requested compute resource has been successfully allocated. In alternate embodiments additional information can also be provided.

If the compute resource is not available, at block 910, the resource manager (or other component(s)) can determine if the requested requirements can be met by configuring available resources from the resource pool at block 920. If not, a failure response can be provided via the resource API at block 970. If the requested requirements can be met with the resource pool, the resource manager can function to connect the desired resources (e.g., processor(s), memory, storage, network) utilizing the RAs and other elements as discussed herein at block 930.

Figure 10:
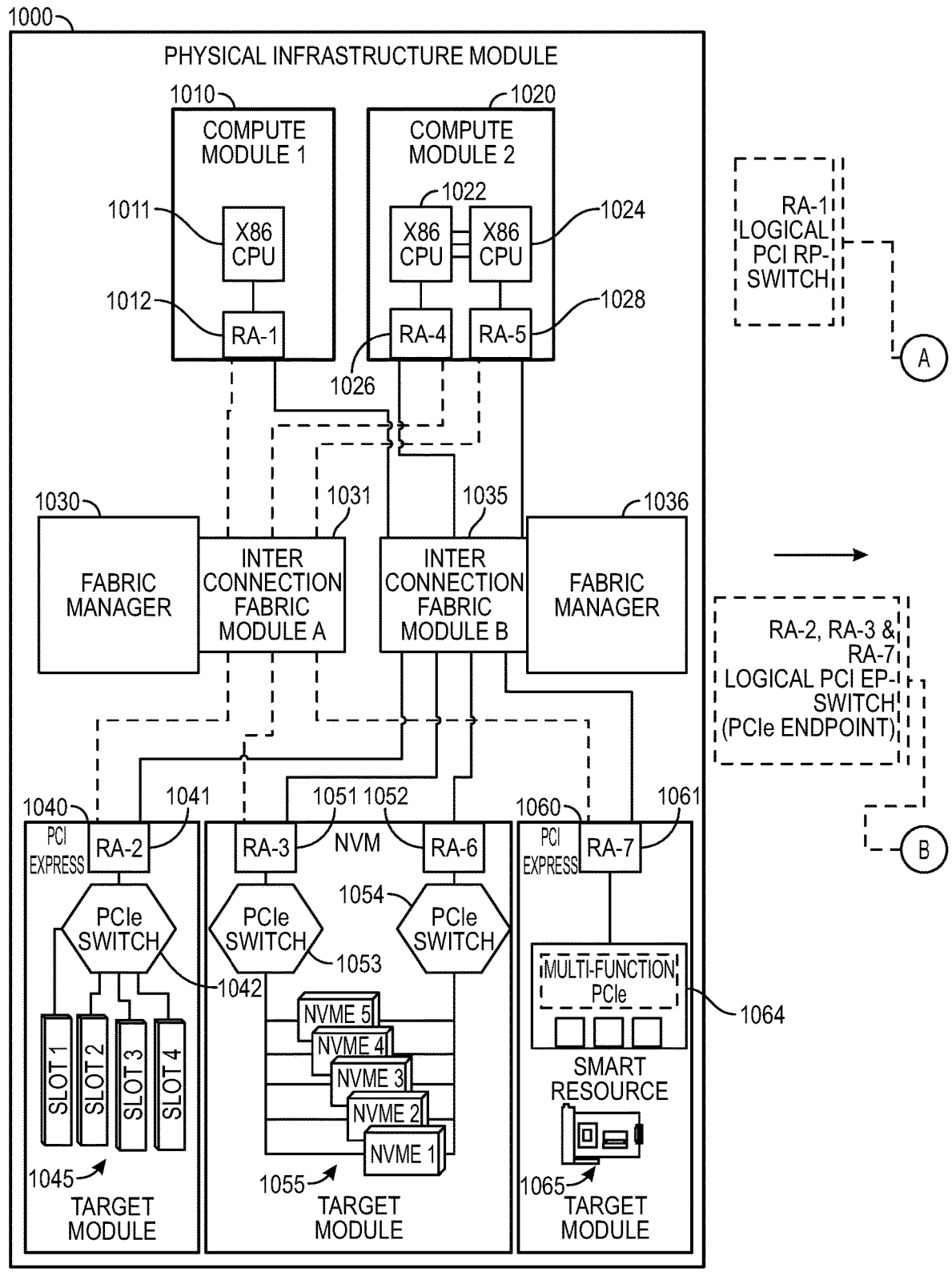
FIG. 10 is a conceptual diagram of one embodiment of an infrastructure resource pool providing composable infrastructure resources configured as a set of logical servers.
Figure 10:
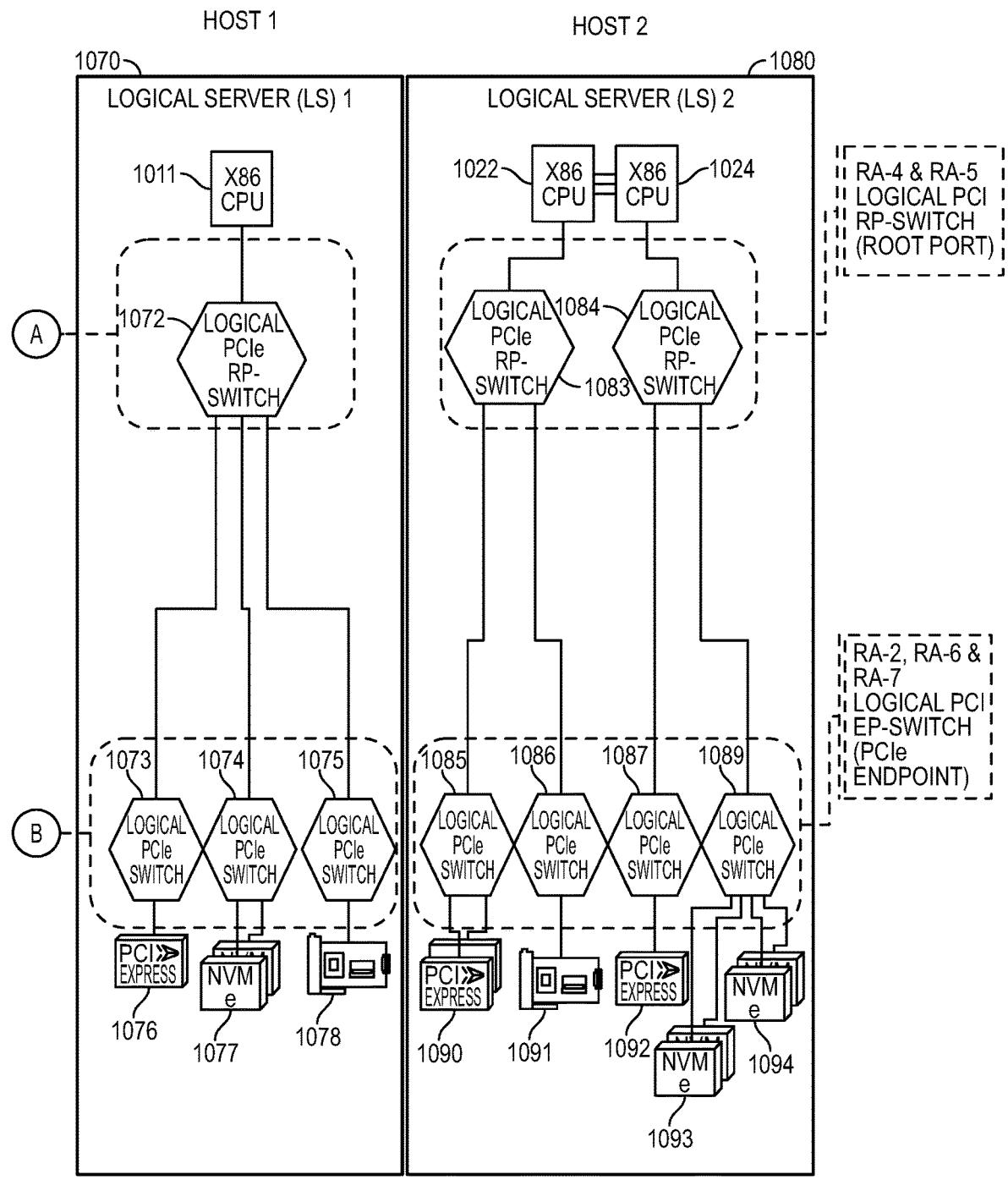

FIG. 10 is a conceptual diagram of one embodiment of an infrastructure resource pool providing composable infrastructure resources configured as a set of logical servers. FIG. 10 provides one example use case for mapping physical and virtual functions provided by compute modules and target modules to achieve a logical server architecture. The example of FIG. 10 provides a more complex and flexible example than the example of FIG. 3.

Infrastructure resource pool 1000 includes the various physical infrastructure modules, for example, compute resource modules 1010 and 1020, and target resource modules 1040, 1050 and 1060. Any number of compute modules and target modules can be supported. In the example embodiment of FIG. 10, this includes compute resource module 1010 having at least one processing core 1011 and corresponding C-RA 1012 (labeled RA-1) and compute resource module 1020 having processing cores 1022 and 1024, and corresponding C-RAs 1026 and 1028 (labeled RA-4 and RA-5, respectively). Processing cores can be connected to C-RAs utilizing CXL or PCIe protocols, for example.

Infrastructure resource pool 1000 further includes target resource modules 1040, 1050 and 1060 each having one or more resources 1045, 1055 and 1065, respectively. Resources can be connected to T-RAs utilizing CXL or PCIe protocols, for example. In the example of FIG. 10, target resource module 1040 includes a single T-RA 1041 (labeled RA-2), PCIe switch 1042 and multiple PCIe slots 1045 coupled with switch 1042. Similarly, target module 1060 includes a single T-RA 1061 (labeled RA-7), multi-function PCIe device 1064 shown as a smart resource 1065. Target module 1050 includes two T-RAs 1051 and 1052 (labeled RA-3 and RA-6 respectively) that can be utilized to access dual port NVMe devices 1055 through switches 1053 and 1054.

Interconnection fabrics 1031 and 1035 with associated fabric managers 1030 and 1036, respectively, can function to provide configurable interconnections between the various RAs, which provides interconnections between compute resource modules 1010 and 1020, and target resource modules 1040, 1050 and 1060. In some embodiments the interconnection fabrics are PCIe-based interconnection fabrics. In alternate embodiments, the interconnection fabrics are CXL or Gen-Z based interconnects.

In various embodiments, utilizing interconnection fabrics 1031 and 1035 with fabric managers 1030 and 1036, the modules from infrastructure resource pool 1000, various computing architectures can be composed. The example of FIG. 10 illustrates a pair of logical servers (e.g., 1070, 1080). Other configurations can also be supported.

In the example configuration illustrated in FIG. 10, logical server 1070 can include processing core(s) 1011 and logical server 1080 can include processing cores 1022 and 1024. C-RA 1012 (RA-1), is configured to provide the functionality of logical PCIe switch 1072.

Portions of T-RA 1041 (RA-2) can be configured to provide the functionality of logical PCIe switch 1073, which can function as an interface to some or all of PCIe slots 1045 (labeled as PCIe device 1076). Portions of interconnection fabric 1031 and portions of interconnection fabric 1035 and T-RA 1051 (RA-3) can be configured to provide the functionality of logical PCIe switch 1074, which can function as an interface to some or all of NVMe devices 1055 (labeled as NVMe device 1077). Portions of interconnection fabric 1031 and portions of interconnection fabric 1035 and T-RA 1061 (RA-7) can be configured to provide the functionality of logical PCIe switch 1075, which can function as an interface to multi-function PCIe device 1064 (labeled as multi-function device 1078).

In the example configuration illustrated in FIG. 10, logical server 1080 can include processing cores 1022 and 1024. C-RA 1026 (RA-4), C-RA 1028 (RA-5), portions of interconnection fabric 1031 and portions of interconnection fabric 1035 can be configured to provide the functionality of logical PCIe switch 1083 and logical PCIe switch 1084.

Portions of interconnection fabric 1031 and portions of interconnection fabric 1035 and T-RA 1041 (RA-2) can be configured to provide the functionality of logical PCIe switch 1085, which can function as an interface to some or all of PCIe slots 1045 (labeled as PCIe device 1090). Portions of interconnection fabric 1031 and portions of interconnection fabric 1035 and T-RA 1061 (RA-7) can be configured to provide the functionality of logical PCIe switch 1086, which can function as an interface to some or all of multifunction device 1064 (labeled as multifunction device 1091).

Portions of interconnection fabric 1031 and portions of interconnection fabric 1035 and T-RA 1041 (RA-2) can be configured to provide the functionality of logical PCIe switch 1087, which can function as an interface to PCIe slots 1045 (labeled as PCIe device 1092). Portions of interconnection fabric 1031 and portions of interconnection fabric 1035, T-RA 1051 (RA-3) and T-RA 1052 (RA-6) can be configured to provide the functionality of logical PCIe switch 1089, which can function as an interface to some or all of NVMe devices 1055 (labeled as NVMe devices 1093 and 1094).

Figure 11:
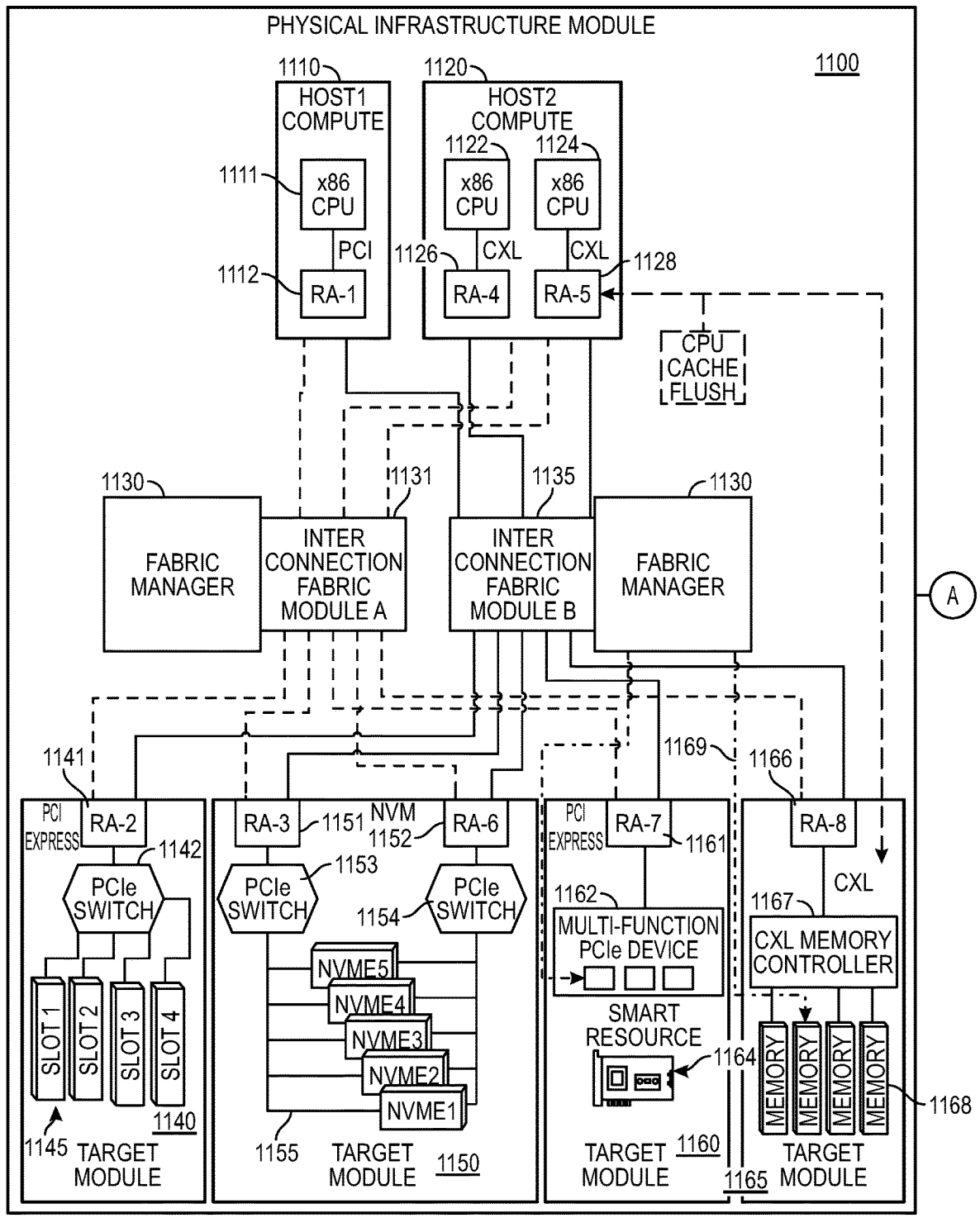
FIG. 11 is a conceptual diagram of logical servers, configured to utilize peer-to-peer communications over the composable architecture parallel interconnect fabrics.
Figure 11:
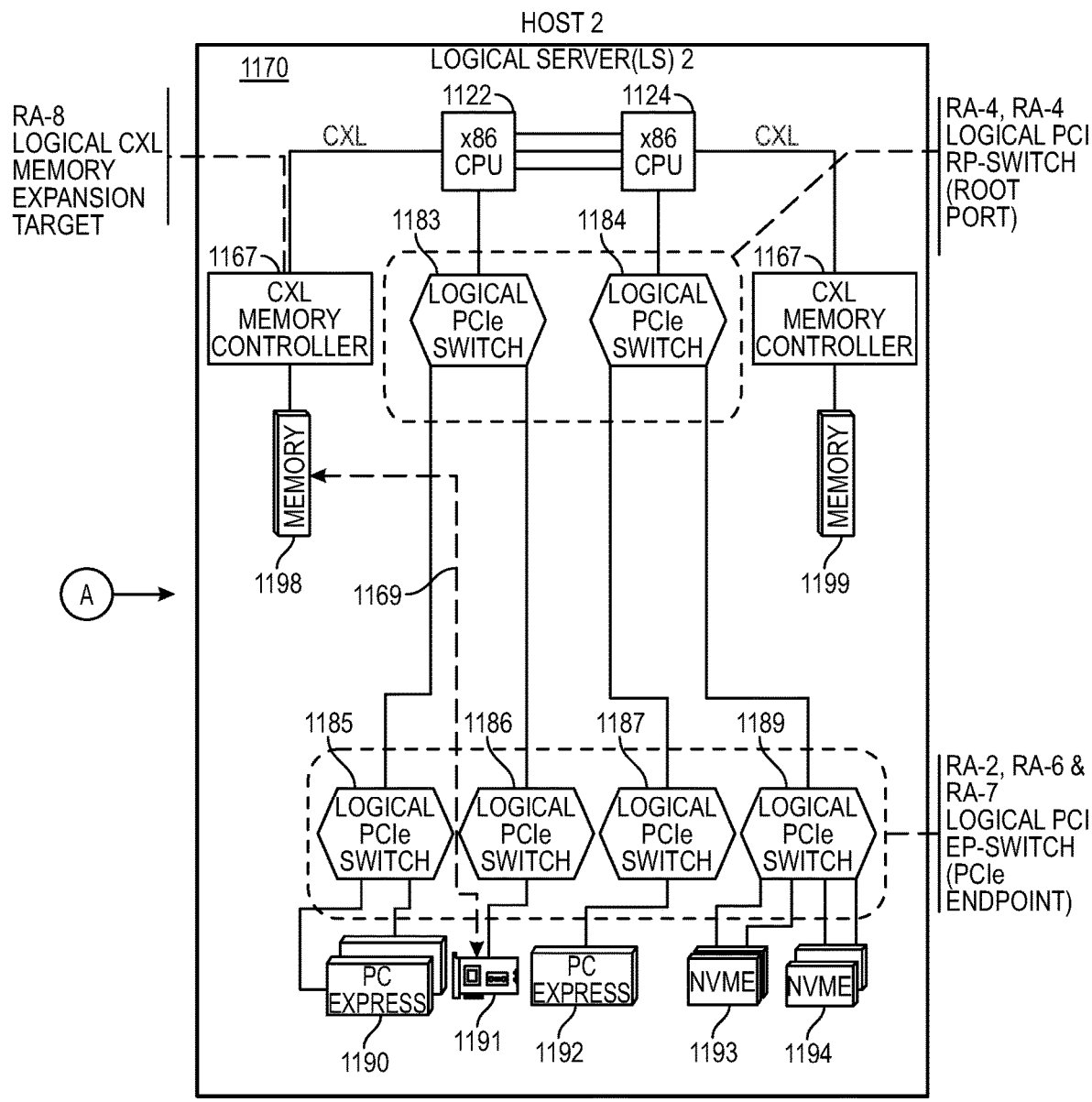

FIG. 11 is a conceptual diagram of logical servers, configured to utilize peer-to-peer communications over the composable architecture parallel interconnect fabrics. FIG. 11 provides one example use case for mapping physical and virtual functions provided by compute modules and target modules to achieve a logical server architecture having an internal peer-to-peer connection. The example of FIG. 11 provides a more complex and flexible example than the example of FIG. 10.

Infrastructure resource pool 1100 includes the various physical infrastructure modules, for example, compute resource modules 1110 and 1120, and target resource modules 1140, 1150, 1160 and 1165. Any number of compute modules and target modules can be supported. In the example embodiment of FIG. 11, this includes compute module 1110 having one processing core 1111 and corresponding C-RA 1112 (labeled RA-1) and compute module 1120 having processing cores 1122 and 1124, and corresponding C-RAs 1126 and 1128 (labeled RA-4 and RA-5, respectively). Processing cores can be connected to C-RAs utilizing CXL or PCIe protocols, for example.

Infrastructure resource pool 1100 further includes target modules 1140, 1150, 1160 and 1165 each having one or more resources 1145, 1155, 1164 and 1168, respectively. Resources can be connected to T-RAs utilizing CXL or PCIe protocols, for example. In the example of FIG. 11, target module 1140 includes a single T-RA 1141 (labeled RA-2), PCIe switch 1142 and multiple PCIe slots 1145 coupled with switch 1142. Target module 1150 includes two T-RAs 1151 and 1152 (labeled RA-3 and RA-6 respectively) that can be utilized to access dual port NVMe devices 1155 through switches 1153 and 1154.

Similarly, target module 1160 includes a single T-RA 1161 (labeled RA-7), multi-function PCIe device 1162 shown as a smart resource 1164. Target module 1165 includes T-RA 1166 (labeled RA-8), CXL memory controller 1167 and one or more memory modules 1168.

Fabric managers 1130 and 1136, respectively, can function to provide configurable interconnections between the various RAs, which provides interconnections between compute modules 1110 and 1120, and target modules 1140, 1150, 1160 and 1165. In some embodiments the interconnection fabrics are PCIe-based interconnection fabrics. In alternate embodiments, the interconnection fabrics are CXL or Gen-Z based interconnects.

In various embodiments, utilizing interconnection fabrics 1131 and 1135 with fabric managers 1130 and 1136, the modules from infrastructure resource pool 1100, various computing architectures can be composed. The example of FIG. 11 illustrates logical server 1170 with internal peer-to-peer functionality 1169. Other configurations can also be supported.

In the example configuration illustrated in FIG. 11, logical server 1170 can include processing cores 1122 and 1124. C-RA 1126 (RA-4), C-RA 1128 (RA-5), portions of interconnection fabric 1131 and portions of interconnection fabric 1135 can be configured to provide the functionality of logical PCIe switch 1183 and logical PCIe switch 1184.

Portions of interconnection fabric 1131 and portions of interconnection fabric 1135 and T-RA 1141 (RA-2) can be configured to provide the functionality of logical PCIe switch 1185, which can function as an interface to some or all of PCIe slots 1145 (labeled as PCIe device 1190). Portions of interconnection fabric 1131 and portions of interconnection fabric 1135 and T-RA 1161 (RA-7) can be configured to provide the functionality of logical PCIe switch 1186, which can function as an interface to some or all of multifunction device 1164 (labeled as multifunction device 1191).

Portions of interconnection fabric 1131 and portions of interconnection fabric 1135 and T-RA 1141 (RA-2) can be configured to provide the functionality of logical PCIe switch 1187, which can function as an interface to PCIe device 1145 (labeled as PCIe device 1192). Portions of interconnection fabric 1131 and portions of interconnection fabric 1135, T-RA 1151 (RA-3) and T-RA 1152 (RA-6) can be configured to provide the functionality of logical PCIe switch 1189, which can function as an interface to some or all of NVMe devices 1155 (labeled as NVMe devices 1193 and 1194).

Portions of interconnection fabric 1131 and portions of interconnection fabric 1135 and T-RA 1141 (RA-2) can be configured to provide the functionality of logical PCIe switch 1185, which can function as an interface to some or all of PCIe slots 1145 (labeled as PCIe device 1190). Portions of interconnection fabric 1131 and portions of interconnection fabric 1135 and T-RA 1161 (RA-7) can be configured to provide the functionality of logical PCIe switch 1186, which can function as an interface to some or all of multifunction device 1164 (labeled as multifunction device 1191).

Portions of interconnection fabric 1131 and portions of interconnection fabric 1135 and T-RA 1141 (RA-2) can be configured to provide the functionality of logical PCIe switch 1187, which can function as an interface to PCIe device 1145 (labeled as PCIe device 1192). Portions of interconnection fabric 1131 and portions of interconnection fabric 1135, T-RA 1151 (RA-3) and T-RA 1152 (RA-6) can be configured to provide the functionality of logical PCIe switch 1189, which can function as an interface to some or all of NVMe devices 1155 (labeled as NVMe devices 1193 and 1194).

In some embodiments, in addition to the configurable processor-to-resource connections, peer-to-peer connections within logical server 1170 can be supported. For example, resource manager 1136 can function to provide a path through interconnection fabric 1135 between multifunction device 1119 and memory device 1198 via logical PCIe switches 1186 and 1183, and memory controller 1167. This functionality can support processor 1122. A similar configuration (not explicitly illustrated in FIG. 11) can be provided for processor 1124 (to memory device 1199) utilizing PCIe logical switches 1186 and 1184, and memory controller 1167.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A composable compute platform, comprising:
    a first parallel interconnection fabric layer comprising a first plurality of switching fabric branches providing parallel interconnections via the first parallel interconnection fabric layer; and
    a second parallel interconnection fabric layer comprising a second plurality of switching fabric branches providing parallel interconnections via the second parallel interconnection fabric layer;
    wherein:
        a first switching fabric branch of the first plurality of switching fabric branches and a first switching fabric branch of the second plurality of switching fabric branches are communicatively connected to each other and comprise a first switching fabric, a second switching fabric branch of the first plurality of switching fabric branches and a second switching fabric branch of the second plurality of switching fabric branches are communicatively connected to each other and comprise a second switching fabric, and the first switching fabric and the second switching fabric are isolated from each other and provide independent paths for routing packets.

2. The composable compute platform of claim 1, further comprising:

a compute resource comprising a compute resource adapter (C-RA) communicatively connecting the compute resource to the first plurality of switching fabric branches of the first parallel interconnection fabric layer.

3. The composable compute platform of claim 1, further comprising:

an input/output (I/O) resource comprising an I/O resource adapter (I/O-RA) communicatively connecting the I/O resource to the first plurality of switching fabric branches of the first parallel interconnection fabric layer.

4. The composable compute platform of claim 1, wherein:
the first parallel interconnection fabric layer further comprises a first plurality of switching fabric resource adaptors (S-RAs);
the first switching fabric branch of the first plurality of switching fabric branches communicatively connects to a first S-RA of the first plurality of S-RAs; and
the first S-RA of the first plurality of S-RAs communicatively connects to a first S-RA of the second parallel interconnection fabric layer.

5. The composable compute platform of claim 4, wherein:
the second parallel interconnection fabric layer further comprises a second plurality of S-RAs including the first S-RA of the second parallel interconnection fabric layer; and
the first switching fabric branch of the second plurality of switching fabric branches communicatively connects with the first S-RA of the second plurality of S-RAs such that the first switching fabric branch of the second plurality of switching fabric branches communicatively connects with the first switching fabric branch of the first plurality of switching fabric branches.

6. The composable compute platform of claim 1, wherein:
the first parallel interconnection fabric layer further comprises a first plurality of fabric managers associated with the first plurality of switching fabric branches; and
the second parallel interconnection fabric layer further comprises a second plurality of fabric managers associated with the second plurality of switching fabric branches.

7. The composable compute platform of claim 6, further comprising:
a composable resource controller managing the first and second pluralities of fabric managers.

8. The composable compute platform of claim 7, further comprising a user interface communicatively connected to the composable resource controller.

9. The composable compute platform of claim 7, wherein the composable resource controller is configured to:
receive an I/O or memory resource requirement for a compute workload for a host device; and
map I/O resources to individual compute resources based on the received requirements;

wherein the first and second parallel interconnection fabric layers provide communicative connections between the I/O resources and the compute resources.

10. A composable compute platform, comprising: a parallel interconnection fabric layer comprising a plurality of switching fabric branches providing parallel interconnections via the parallel interconnection fabric layer; wherein: a first switching fabric branch of the plurality of switching fabric branches comprises a first switching fabric, and a second switching fabric branch of the plurality of switching fabric branches comprises a second switching fabric, and the first switching fabric and the second switching fabric are isolated from each other and provide independent paths for routing packets; and a second parallel interconnection fabric layer comprising a second plurality of switching fabric branches providing parallel interconnections via the second parallel interconnection fabric layer; wherein: a first switching fabric branch of the second plurality of switching fabric branches comprises the first switching fabric, and a second switching fabric branch of the second plurality of switching fabric branches comprises the second switching fabric.

11. The composable compute platform of claim 10, wherein: the first switching fabric branch of the plurality of switching fabric branches is communicatively connected to the first switching fabric branch of the second plurality of switching fabric branches; and the second switching fabric branch of the plurality of switching fabric branches is communicatively connected to the second switching fabric branch of the second plurality of switching fabric branches.

12. The composable compute platform of claim 11, wherein:
the first parallel interconnection fabric layer further comprises a first plurality of S-RAs;
the first switching fabric branch of the plurality of switching fabric branches communicatively connects to a first S-RA of the first plurality of S-RAs; and
the first S-RA of the first plurality of S-RAs communicatively connects to a first S-RA of the second parallel interconnection fabric layer.

13. The composable compute platform of claim 12, wherein: the second parallel interconnection fabric layer further comprises a second plurality of S-RAS including the first S-RA of the second parallel interconnection fabric layer; and the first switching fabric branch of the second plurality of switching fabric branches communicatively connects with the first S-RA of the second plurality of S-RAs such that the first switching fabric branch of the second plurality of switching fabric branches communicatively connects with the first switching fabric branch of the first plurality of switching fabric branches.

14. The composable compute platform of claim 10, wherein:
the parallel interconnection fabric layer further comprises a plurality of fabric managers associated with the plurality of switching fabric branches.

15. The composable compute platform of claim 14, further comprising:
a composable resource controller managing the plurality of fabric managers.

16. The composable compute platform of claim 15, wherein the composable resource controller is configured to:
receive an I/O or memory resource requirement for a compute workload for a host device; and
map I/O resources to individual compute resources based on the received requirements;

wherein the parallel interconnection fabric layer provides communicative connections between the I/O resources and the compute resources.

17. The composable compute platform of claim 10, wherein the first and second switching fabric branches of the plurality of switching fabrics are communicatively disconnected.

18. The composable compute platform of claim 10, wherein the first switching fabric branch comprises a network of multiple switches.

19. A composable compute platform, comprising: a composable resource controller managing a parallel interconnection fabric layer; and the parallel interconnection fabric layer comprising a plurality of switching fabric branches providing parallel interconnections via the parallel interconnection fabric layer; wherein: a first switching fabric branch of the plurality of switching fabric comprises a first switching fabric, and a second switching fabric branch of the plurality of switching fabric branches comprises a second switching fabric, and the first switching fabric and the second switching fabric are isolated from each other and provide independent paths for routing packets; and a second parallel interconnection fabric layer comprising a second plurality of switching fabric branches providing parallel interconnections via the second parallel interconnection fabric layer; wherein: a first switching fabric branch of the second plurality of switching fabric branches comprises the first switching fabric, and a second switching fabric branch of the second plurality of switching fabric branches comprises the second switching fabric.

* * * * *